United States Patent
Ding et al.

(10) Patent No.: US 9,995,880 B1
(45) Date of Patent: Jun. 12, 2018

(54) WAVELENGTH DIVISION MULTIPLEXING AND DEMULTIPLEXING IN OPTICAL COMMUNICATIONS MODULES, AND METHODS

(71) Applicant: Foxconn Interconnect Technology Limited, Grand Cayman (KY)

(72) Inventors: Li Ding, Pleasanton, CA (US); Ye Chen, San Jose, CA (US); Bing Shao, San Jose, CA (US); Andrew Schmit, Sunnyvale, CA (US); Seng-kum Chan, Santa Clara, CA (US)

(73) Assignee: Foxconn Interconnect Technology Limited, Grand Cayman (KY)

(*) Notice: Subject to any disclaimer, the term of this patent is extended or adjusted under 35 U.S.C. 154(b) by 0 days. days.

(21) Appl. No.: 15/476,515

(22) Filed: Mar. 31, 2017

(51) Int. Cl.
*G02B 6/28* (2006.01)
*G02B 6/293* (2006.01)
*G02B 6/42* (2006.01)

(52) U.S. Cl.
CPC ....... *G02B 6/2938* (2013.01); *G02B 6/29367* (2013.01); *G02B 6/4228* (2013.01); *G02B 6/4292* (2013.01)

(58) Field of Classification Search
CPC ........ G02B 6/28; G02B 6/125; G02B 6/2813; G02B 6/2804; G02B 6/2817
See application file for complete search history.

(56) References Cited

U.S. PATENT DOCUMENTS

| | | |
|---|---|---|
| 6,198,864 B1 | 3/2001 | Lemoff et al. |
| 6,201,908 B1 | 3/2001 | Grann |
| 6,563,976 B1 | 5/2003 | Grann et al. |
| 6,572,278 B2 | 6/2003 | Hsieh et al. |
| 6,652,161 B2 | 11/2003 | Grann et al. |
| 6,769,816 B2 | 8/2004 | Capewell et al. |
| 6,870,976 B2 | 3/2005 | Chen et al. |
| 6,941,047 B2 | 9/2005 | Capewell et al. |
| 7,260,328 B2 | 8/2007 | Kropp |
| 7,272,323 B2 | 9/2007 | Grann et al. |
| 7,327,771 B2 * | 2/2008 | Kim ............. G02B 6/12004 372/50.1 |
| 7,349,602 B2 | 3/2008 | Panotopoulos |
| 8,190,025 B2 * | 5/2012 | Presley ............. G02B 6/3544 356/325 |

(Continued)

*Primary Examiner* — Jennifer Doan
(74) *Attorney, Agent, or Firm* — Thomas | Horstemeyer, LLP

(57) ABSTRACT

An optical communications module is provided that has WDM capabilities for increased bandwidth and that is suitable for use with single mode optical fiber or multimode optical fiber. The module can be configured to have both WDM and BiDi functionality to further increase bandwidth and can have a single- or multi-channel configuration. The module has an integrally-formed body having an optical port and portions of an optical coupling system that are integrally formed in the body. The optical port is adapted to mate with an end of an optical fiber cable that holds one or more ends of one or more optical fibers, depending on whether the module is a single-channel or multi-channel module. The optical coupling system couples light between an end or ends of one or more optical fibers and one or more optoelectronic devices in a way that reduces back reflection and mode partition noise.

25 Claims, 14 Drawing Sheets

(56) References Cited

U.S. PATENT DOCUMENTS

| | | |
|---|---|---|
| 8,540,437 B2 | 9/2013 | Lee et al. |
| 9,323,013 B2 | 4/2016 | Shao et al. |
| 2004/0061346 A1 | 4/2004 | Capewell |
| 2016/0246008 A1 | 8/2016 | Tan et al. |
| 2016/0365928 A1 | 12/2016 | Xiao et al. |

* cited by examiner

WAVELENGTH DIVISION MULTIPLEXING AND DEMULTIPLEXING IN OPTICAL COMMUNICATIONS MODULES, AND METHODS

TECHNICAL FIELD OF THE INVENTION

The invention relates to optical communications networks over which data is communicated in the form of optical signals over optical waveguides. More particularly, the invention relates to optical communications modules having wavelength division multiplexing and/or demultiplexing capabilities.

BACKGROUND OF THE INVENTION

In optical communications networks, optical communications modules are used to transmit and/or receive optical signals over optical fibers. Optical receiver modules are optical communications modules that receive optical signals, but do not transmit optical signals. Optical transmitter modules are optical communications modules that transmit optical signals, but do not receive optical signals. Optical transceiver modules are optical communication modules that transmit and receive optical signals.

An optical transmitter or transceiver module has a light source that is driven by a driver circuit to cause the light source to generate amplitude and/or phase and/or polarization modulated optical signals that represent data. The modulated optical signals are optically coupled onto an end of an optical fiber by an optics system of the module. The light source is typically a laser diode or light emitting diode (LED). The optics system typically includes one or more reflective (e.g., mirrors), refractive (e.g., lenses) and/or diffractive (e.g., gratings) elements.

An optical receiver or transceiver module includes a photodetector (e.g., a p-doped-intrinsic-n-doped (PIN) diode) that detects an optical data signal passing out of an end of an optical fiber and converts the optical data signal into an electrical signal, which is then amplified and processed by electrical circuitry of the module to recover the data. An optics system of the module optically couples the optical data signals passing out of the end of the optical fiber onto the photodetector.

As the demand for data throughput continues to increase, the data rate, or bandwidth, of optical links is being pushed ever higher. While various transceiver and optical fiber link designs enable the bandwidth of optical fiber links to be increased, there are limitations on the extent to which currently available technologies can increase the bandwidth of an optical link. One way to increase the bandwidth of an optical link is to use multi-channel optical communications modules, also known as parallel optical communications modules, which transmit and receive optical data signals over multiple channels in parallel. Another way to increase the bandwidth of an optical link is to use wavelength division multiplexing and demultiplexing (WDM) to enable multiple optical data signals of different wavelengths to be sent over the same optical fiber. Yet another way to increase the bandwidth of an optical link is to transmit and receive optical signals of different wavelengths over each optical fiber, which is commonly referred to as bidirectional (BiDi) communications.

While multi-channel optical communications modules that incorporate WDM and/or BiDi functionality exist, they are very challenging to design and manufacture. One challenge is achieving sufficiently precise optical alignment between the light sources and the optical elements of the optical coupling system and between the photodetectors and the optical elements of the optical coupling system. If sufficiently precise optical alignment is not achieved, performance will be degraded. To date, optical communications modules that incorporate WDM use single mode optical fibers (SMFs) in the optical link, which have a diameter of around 10 micrometers (microns). With fibers that are this small in diameter, a variety of passive and active alignment devices and techniques are needed to achieve sufficiently precise optical alignment. Active alignment devices and techniques can be expensive and time consuming to perform.

Another challenge with designing and manufacturing multi-channel optical communications modules that incorporate WDM and/or BiDi functionality is sufficiently reducing back reflection of light from the end face of the optical fiber into the aperture of the light source. If back reflection is not properly managed, performance will be degraded. Therefore, the optical coupling system needs to be designed and manufactured to sufficiently reduce the amount of back-reflected light that is incident on the aperture of the light source.

Another challenge with designing and manufacturing multi-channel optical communications modules that incorporate WDM and/or BiDi functionality is matching the light modes of the light produced by the light source with the light modes of the optical fiber. The launch conditions provided by the optical coupling system when launching light into the end face of the optical fiber need to be such that the light modes of the light produced by the light source closely match the light modes of the optical fiber. If such mode matching is not achieved, the optical link will experience high relative intensity noise (RIN) that will degrade performance. Mode matching is more of a problem in cases where multimode optical fiber (MMF) is used due to the fact that MMFs exhibit greater mode dispersion than SMFs. For that reason, MMFs are typically only used in relatively short optical links. MMF has a much larger diameter (e.g., 60 microns) than SMF, and therefore optical alignment is less difficult to achieve. MMF is also less expensive than SMF, but as indicated above, exhibits higher mode dispersion than SMF, which leads to higher RIN.

A need exists for an optical communications module that has WDM capabilities for increased bandwidth, that is suitable for use with MMF, that uses passive alignment devices and techniques, that can be manufactured cost effectively, and that can be relatively easily assembled.

SUMMARY

The inventive principles and concepts are directed to an optical communications module that can be configured to perform wavelength division multiplexing, demultiplexing and bidirectional communications. The optical communications module configured to perform wavelength division multiplexing comprises an integrally-formed optical unibody, an optical port integrally formed in the unibody, at least first and second sets of passive alignment features integrally formed in the unibody, at least a first set of N optical elements integrally formed in the unibody, and at least a second optical element integrally formed in the unibody. The unibody comprises an optical material that is transmissive to light of N different wavelengths, where N is a positive integer that is greater than or equal to 2. The optical port is adapted to couple with an end of the optical cable or with a ferrule disposed on the end of the optical cable. The first and second sets of passive alignment features are used to passively align one or more optical components with the unibody in at least first and second directions. The first set of N optical elements, the second optical element and the one or more optical components together comprise an optical coupling system of the optical communications module and are arranged to multiplex N light beams of N respective different wavelengths of light into the optical port for transmission over the optical cable.

The optical communications module configured to perform wavelength division demultiplexing comprises an integrally-formed optical unibody, an optical port integrally formed in the unibody, at least first and second sets of passive alignment features integrally formed in the unibody, at least a first set of N optical elements integrally formed in the unibody, and at least a second optical element integrally formed in the unibody. The unibody comprises an optical material that is transmissive to light of N different wavelengths, where N is a positive integer that is greater than or equal to 2. The optical port is adapted to couple with an end of the optical cable or with a ferrule disposed on the end of the optical cable. The optical cable has at least one optical waveguide The first and second sets of passive alignment features are used to passively align one or more optical components with the unibody in at least first and second directions. The first set of N optical elements, the second optical element and the one or more optical components together comprise an optical coupling system of the optical communications module and are arranged to demultiplex a light beam comprising N different wavelengths received in the optical port from an end of the optical waveguide into N light beams of N respective different wavelengths.

The optical communications module configured to perform bidirectional optical communications comprises an integrally-formed optical unibody, an optical port integrally formed in the unibody, at least first and second sets of passive alignment features integrally formed in the unibody, at least a first set of N optical elements integrally formed in the unibody, and at least a second optical element integrally formed in the unibody. The unibody comprises an optical material that is transmissive to light of N wavelengths, where N is a positive integer that is greater than or equal to 2. The optical port is adapted to couple with an end of an optical cable having at least a first optical waveguide or with a ferrule disposed on the end of the optical cable. The first and second sets of passive alignment features are used to passively align one or more optical components with the unibody in at least first and second directions. The first set of N optical elements, the second optical element and the one or more optical components together comprise an optical coupling system of the optical communications module and are arranged to couple at least a first light beam of a first wavelength into the optical port for transmission over the first optical waveguide and to receive at least a second light beam of a second wavelength passing out of the end of the first optical waveguide into the optical port. The first and second wavelengths being different from one another.

These and other features and advantages will become apparent from the following description, drawings and claims.

DETAILED DESCRIPTION OF AN ILLUSTRATIVE EMBODIMENT

Figure 1:
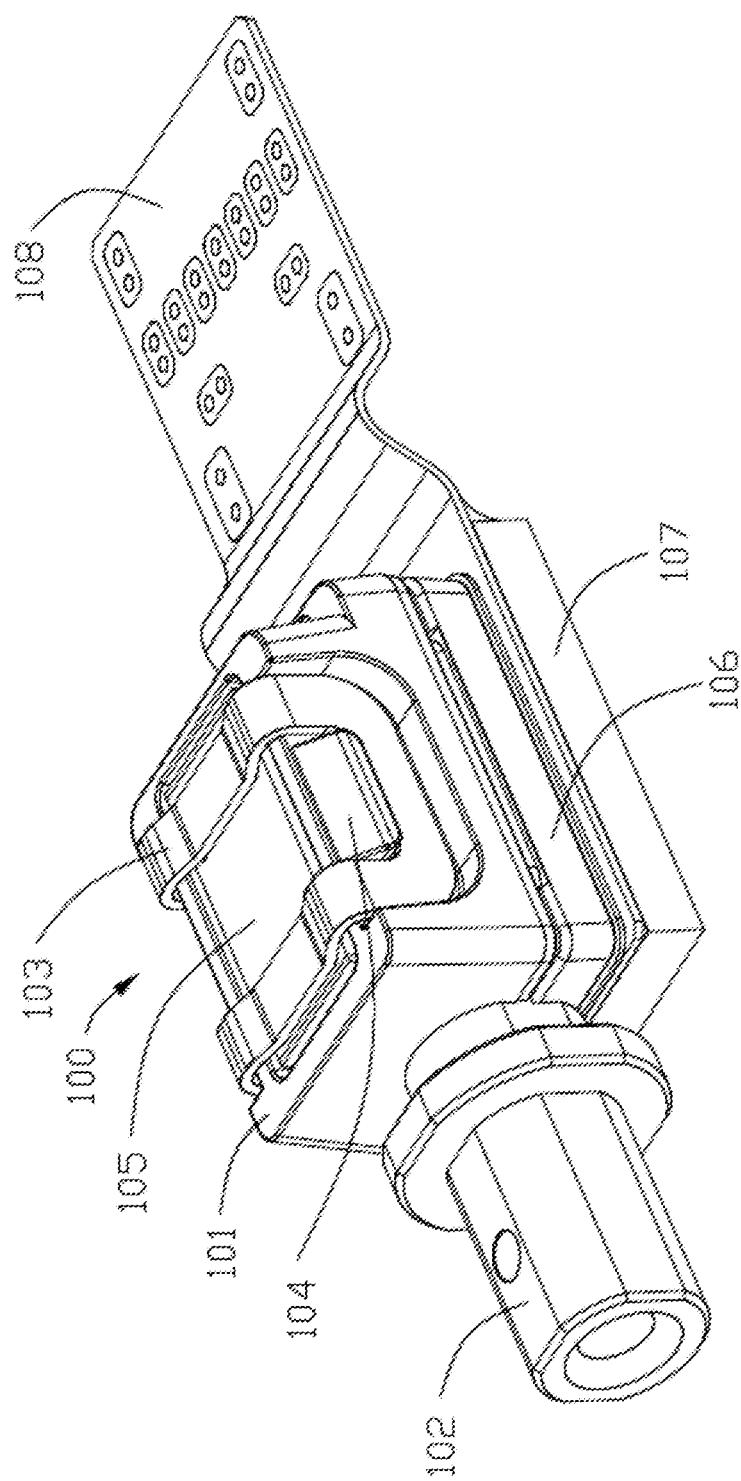
FIG. 1 illustrates a top perspective view of the WDM optical communications module in accordance with a representative embodiment adapted to mate with an end of an optical fiber cable or with a ferrule disposed on the end of the optical fiber cable.

Representative embodiments are disclosed herein of an optical communications module having WDM functionality for increased bandwidth and that is suitable for use with SMF and MMF. In some embodiments the optical communications module has both WDM and BiDi functionality to further increase bandwidth. Embodiments of the optical communications module include single-channel and multi-channel configurations. The optical communications module has an integrally-formed body, i.e., a unitary piece part, referred to hereinafter as a "unibody," that has an optical port and an optical coupling system that are integrally formed in the unibody. The optical port is adapted to mate with an end of an optical fiber cable that holds one or more ends of one or more respective optical fibers, depending on whether the optical communications module is a single-channel or multi-channel module. The optical coupling system couples light between one or more ends of one or more optical fibers of the optical fiber cable and one or more optoelectronic devices in a way that reduces back reflection and improves mode matching. The unibody has passive alignment devices integrally formed therein for precisely passively aligning the optical elements of the optical coupling system with the optoelectronic device or devices and with the optical fiber end or ends. Representative embodiments are described below with reference to FIGS. 1-14, in which like reference numerals represent like elements, features or components.

Traditionally, in cases where WDM has been used to communicate multiple optical data signals of different wavelengths over a single optical fiber, a SMF has been used. The wavelengths that have been used for this purpose range from about 1100 nanometers (nm) to about 1550 nm. As indicated above, SMF is more expensive than MMF. In accordance with a preferred embodiment, the optical communications module performs WDM using wavelengths that range from about 840 nm to about 950 nm. Using this wavelength range allows lower-cost vertical cavity surface emitting laser diodes (VCSELs) to be used as the light sources in the optical communications modules. Additionally, the optical communications module is configured in such a way that it achieves low optical loss, high signal isolation, low back reflection, and low mode partition noise (MPN), which allows the module to be used with MMF instead of SMF to achieve further cost reductions.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature. More particularly, the words "exemplary" or "representative" as used herein indicate one among several examples, and it must be understood that no undue emphasis or preference is being directed to the particular example being described. It should also be understood that the word "representative," as used herein, is intended to be non-exclusionary and non-limiting in nature. More particularly, the word "representative," as used herein, indicates one among several examples, and no undue emphasis or preference is being directed to the particular example being described.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "an element" includes one element and plural elements. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The terms "approximately" or "about" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than connectors (e.g., bonding materials, mechanical fasteners, etc.).

FIG. 1 illustrates a top perspective view of the WDM optical communications module 100 in accordance with a representative embodiment adapted to mate with an end of an optical fiber cable (not shown) or with a ferrule (not shown) disposed on the end of the optical fiber cable (not shown). As will be described below in more detail, the WDM optical communications module 100 can be configured as a WDM optical transmitter module that transmits multiple wavelengths over a single optical fiber or as a WDM optical receiver module that receives multiple wavelengths over a single optical fiber. As indicated above, the WDM optical communications module 100 has an integrally-formed body, i.e., a unitary piece part, referred to herein as a "unibody," 101 that has an optical port 102, a plurality of optical elements (not visible in FIG. 1) and a plurality of passive alignment devices (not visible in FIG. 1) that are integrally formed in the unibody 101. The optical port 102 is adapted to mate with an end of an optical fiber cable (not shown) or with a ferrule disposed on an end of an optical fiber cable (not shown). The unibody 101 comprises an optical material that is transmissive to light of the N wavelengths, where N is a positive integer that is greater than or equal to 2.

In accordance with this representative embodiment, the WDM optical communications module 100 has a fixing clip 103 that latches to a latching device 104 to exert a downward force against a block 105. In some embodiments, the block 105 is a mirror that is a component of the optical coupling system and in other embodiments, the block 105 is a fixing plate that is used to apply a downward force against other elements of an optical coupling system (not shown), as will be described below in more detail. The unibody 101 is mechanically coupled with a mounting base 106 of the module 100 that is mechanically coupled with a substrate 107 (e.g., a printed circuit board (PCB)) of the module 100. In accordance with this representative embodiment, the substrate 107 is mechanically and electrically coupled with a flex circuit 108 that is used to electrically couple the module 100 to external electrical circuitry (not shown). As will be described below in more detail, one or more optoelectronic devices (not visible in FIG. 1) are mounted on an upper surface of the substrate 107 in alignment with optical elements of the optical coupling system that are either integrally formed in or mechanically coupled with the unibody 101.

Figure 2:
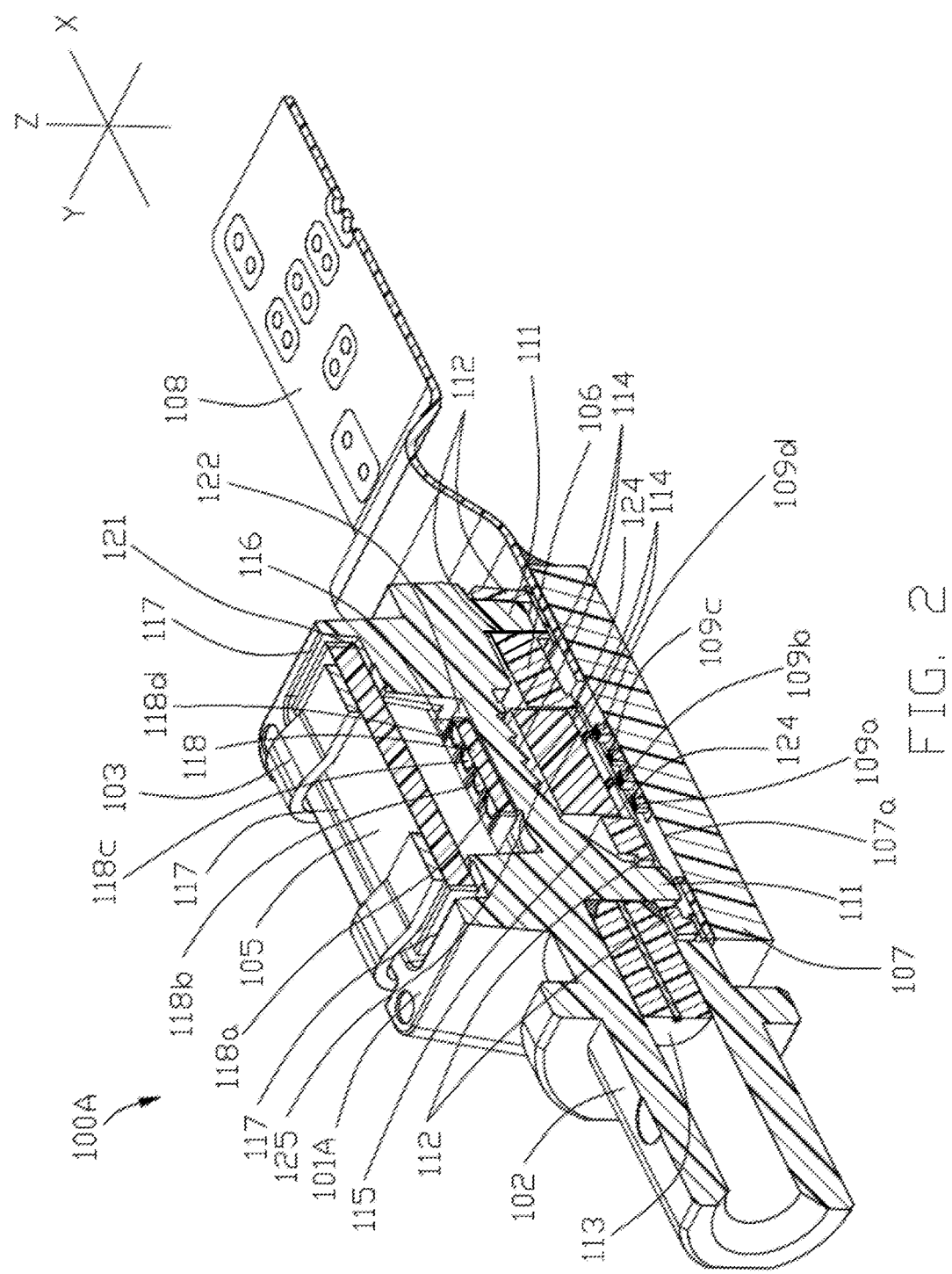
FIG. 2 illustrates a cross-sectional perspective view of the WDM optical communications module shown in FIG. 1 configured as a WDM optical transmitter module.

FIG. 2 illustrates a cross-sectional perspective view of the WDM optical communications module shown in FIG. 1 configured as a WDM optical transmitter module 100A. In accordance with this representative embodiment, a top surface 107a of the substrate 107 has four VCSELs 109a-109d mounted on it that emit light of four different wavelengths, λ1, λ2, λ3 and λ4, respectively. The VCSELs 109a-109d are mounted at preselected locations on the top surface 107a of the substrate 107. The mounting base 106 has passive alignment features 112 that engage respective passive alignment features 111 disposed on the unibody 101A to passively align the mounting base 106 with the unibody 101A. In accordance with this representative embodiment, the passive alignment features 112 of the mounting base 106 are side walls of two slots formed in the mounting base 106 and the passive alignment features 111 of the unibody 101A are two ridges that protrude from a bottom side of the unibody 101A and that are sized, shaped and positioned to precisely engage the two slots.

The mounting base 106 is secured to the substrate 107 via an attachment mechanism, such as epoxy, for example, in an aligned position and orientation relative to the substrate 107. The VCSELs 109a-109d and other components (e.g., resistors, capacitors, processor IC, etc.) that are mounted on the substrate 107 are typically mounted using a known pick-and-place process and system in combination with a machine vision system and process that use fiducials to mount the VCSELs 109a-109d and any other components at precise locations and with precise orientations on the substrate 107. Because the unibody 101A is in precise alignment with the mounting base 106, which is in precise alignment with the substrate 107, and because the VCSELs 109a-109d are mounted with precision at preselected locations and with preselected orientations on the substrate 107, the VCSELs 109a-109d are in precise alignment with the unibody 101A and with features or elements that are integrally formed in the unibody 101A.

In accordance with this representative embodiment, the optical port 102 of the unibody 101A has an optical fiber stub 113 disposed therein that abuts the end of the optical fiber cable (not shown) that is mated with the optical port 102. In other embodiments, the optical fiber stub 113 is not used. The unibody 101A has a first set of optical elements 114 integrally formed therein. The unibody 101A has a second optical element 115 integrally formed therein. The unibody 101A has first and second sets of passive alignment features 116 and 117, respectively, integrally formed therein that are used to passively align a filter block 118 and a mirror 105, respectively, with the unibody 101A in X- and Y-directions of an X, Y Z Cartesian coordinate system. The first set of passive alignment features 116 comprises side walls of a first area of the unibody 101A in which the filter block 118 is disposed. Likewise, the second set of passive alignment features 117 comprises side walls of a second area of the unibody 101A in which the mirror 105 is disposed. In accordance with this representative embodiment, there is nothing except air in between the filter block 118 and the mirror 105.

The unibody 101A has a passive alignment feature 121 integrally formed therein that is used to passively align the mirror 105 with the unibody 101 in a Z-direction of the X, Y Z Cartesian coordinate system. The unibody 101A has a passive alignment feature 122 integrally formed therein that is used to passively align the filter block 118 with the unibody 101A in the Z-direction. The passive alignment features 121 and 122, respectively, are respective mounting surfaces of the unibody 101A on which the filter block 118 and the mirror 105 are mounted. Aligning the mirror 105 and the filter block 118 with the unibody 101A in the Z-direction aligns the mirror 105 and the filter block 118 with one another in the Z-direction and aligns them with the VCSELs 109a-109d in the Z-direction.

The mounting base 106, in accordance with this representative embodiment, has a set of passive alignment features 124 integrally formed therein that is used for passively alignment a diffractive optical element (DOE) 125 with the mounting base 106 in the X- and Y-directions. The passive alignment features 124 are walls that define an opening in the mounting base 106 that is complementary in shape and size to the X- and Y-dimensions of the DOE 125. The DOE 125 is inserted into the opening and adjusted in the Z-direction until it is at a desired position along the Z axis and then secured to the mounting base 106 with a suitable attachment mechanism, such as epoxy, for example. The DOE 125 typically comprises glass, although it may comprise other materials.

In accordance with this representative embodiment, the mounting base 106 is secured to an upper surface of the flex circuit 108, which is secured to the top surface 107a of the substrate 107. It should be noted that the flex circuit 108 is only one of many electrical interfaces that may be used to electrically couple the VCSELs 109a-109d and any other circuit components that are mounted on the substrate 107 with external electrical circuitry (not shown). For example, the substrate 107 could have an electrical interface disposed on its bottom surface opposite the top surface 107a, such as a ball grid array (BGA) connector, for example, that is adapted to mate with and electrically interconnect with an external electrical interface, such as, for example, a BGA socket.

In accordance with a preferred embodiment, the unibody 101A is a molded plastic piece part formed via a known plastic injection molding process. Because plastic parts formed via plastic injection molding processes can be formed very precisely, features of the unibody 101A, such as, for example, the passive alignment features 111, 116 and 117, the first set of optical elements 114 and the second optical element 115, respectively, can be integrally formed in the unibody 101A with very high precision. This allows passive alignment features such as those described above and passive alignment techniques to be used to assemble the optical coupling system of the module and to achieve optical alignment between the end of the optical fiber (not shown) that is mated with the optical port 102, the optical coupling system and the VCSELs 109a-109d. The combination of the first set of optical elements 114, the second optical element 115, the DOE 125, the filter block 118, and the mirror 105 comprise the optical coupling system of the WDM optical transmitter module 100A.

Figure 3:
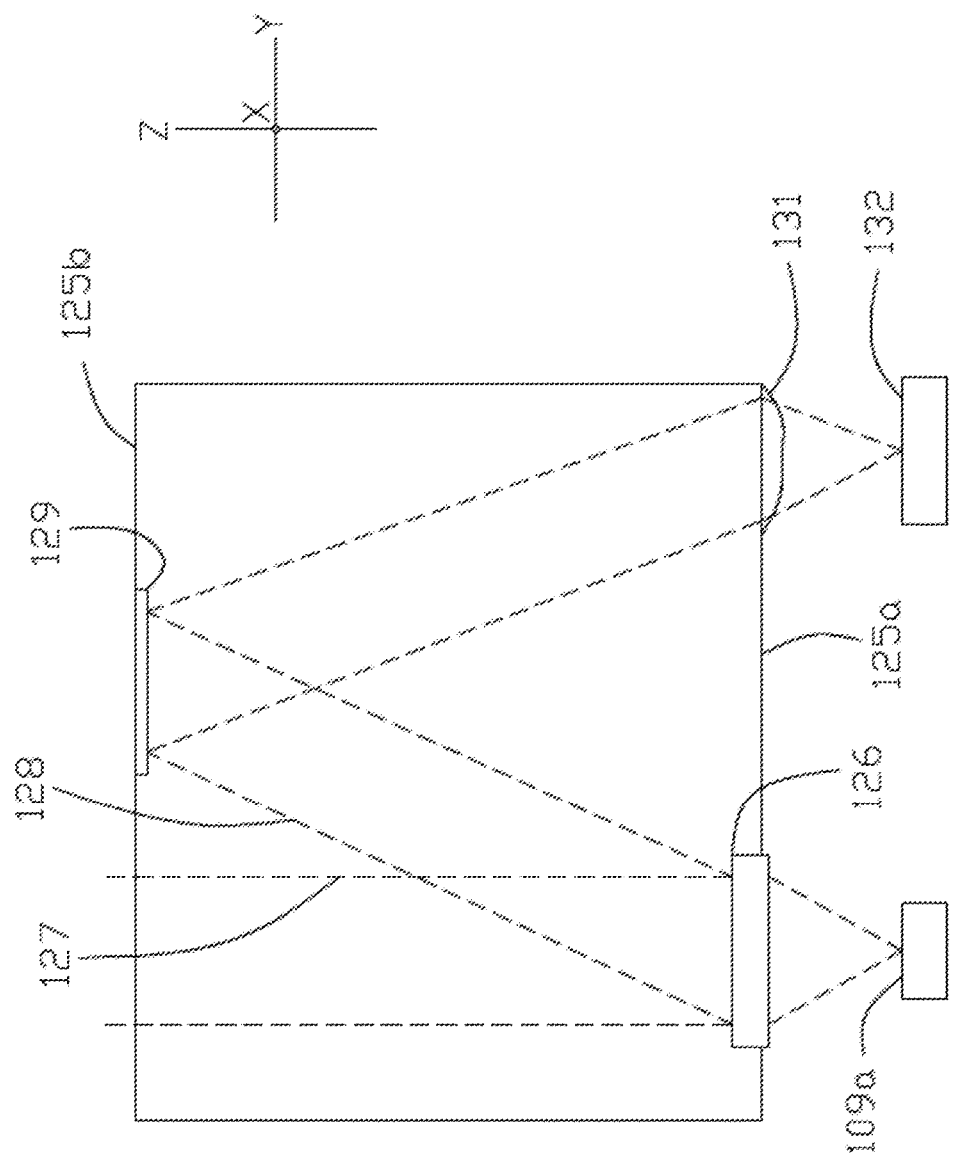
FIG. 3 illustrates a plan view of the diffractive optical element shown in FIG. 2 in accordance with a representative embodiment that performs a plurality of optical functions, including beam collimation, beam splitting and mode scrambling.

FIG. 3 illustrates a plan view of the DOE 125 shown in FIG. 2 in accordance with a representative embodiment. In accordance with this representative embodiment, the DOE 125 performs a plurality of optical functions, including beam collimation, beam splitting and mode scrambling. In accordance with this representative embodiment, the DOE 125 has a bottom surface 125*a* that acts as a collimating lens, a computer-generated hologram (CGH) and a diffraction grating. The block 126 represents this optical element of the DOE 125. The optical element 126 collimates each of the light beams emitted by the VCSELs 109*a*-109*d*, splits each light beam into a main beam portion 127 and a monitor beam portion 128, and performs mode scrambling to scramble the light modes of each beam in a predetermined manner that ensures low MPN. The DOE 125 has a top surface 125*b* that has a reflective portion 129 that is reflective to the light beams emitted by the VCSELs 109*a*-109*d*. The reflective portion 129 reflects the monitor beam portions 128 onto respective focusing lenses 131, which focus the respective monitor beam portions onto respective monitor light detectors 132, e.g., monitor PIN diodes. It should be noted that the focusing lenses 131 may be refractive or diffractive optical elements.

The collimated main beam portions 128 that pass through the top surface 125*b* of the DOE 125 are incident on respective filters of the filter block 118. Prior to the collimated main beam portions 128 being incident on the respective filters of the filter block 118, the main beam portions 128 pass through the first set of optical elements 114 (FIG. 2). The optical elements 114 are tilted surfaces that are at a predetermined tilt angle relative to the mounting surface 122 (FIG. 2) to cause the collimated main beam portions 128 (FIG. 3) to be refracted by the tilt angle as the collimated main beam portions 128 pass through the optical elements 114. The optical elements 114 prevent back-reflected light from being coupled onto the same optical pathways taken by the main beam portions 128, and therefore prevent back-reflected light from being coupled into the apertures of the VCSELs 109*a*-109*d*. The tilted collimated main light beam portions 128 are incident on the respective filters of the filter block 118.

In some embodiments of the WDM optical transmitter module 100A, the DOE 125 is replaced by one or more other types of optical element, such as one or more refractive optical elements, for example, that perform the same or similar optical functions to those performed by the DOE 125.

Figure 4:
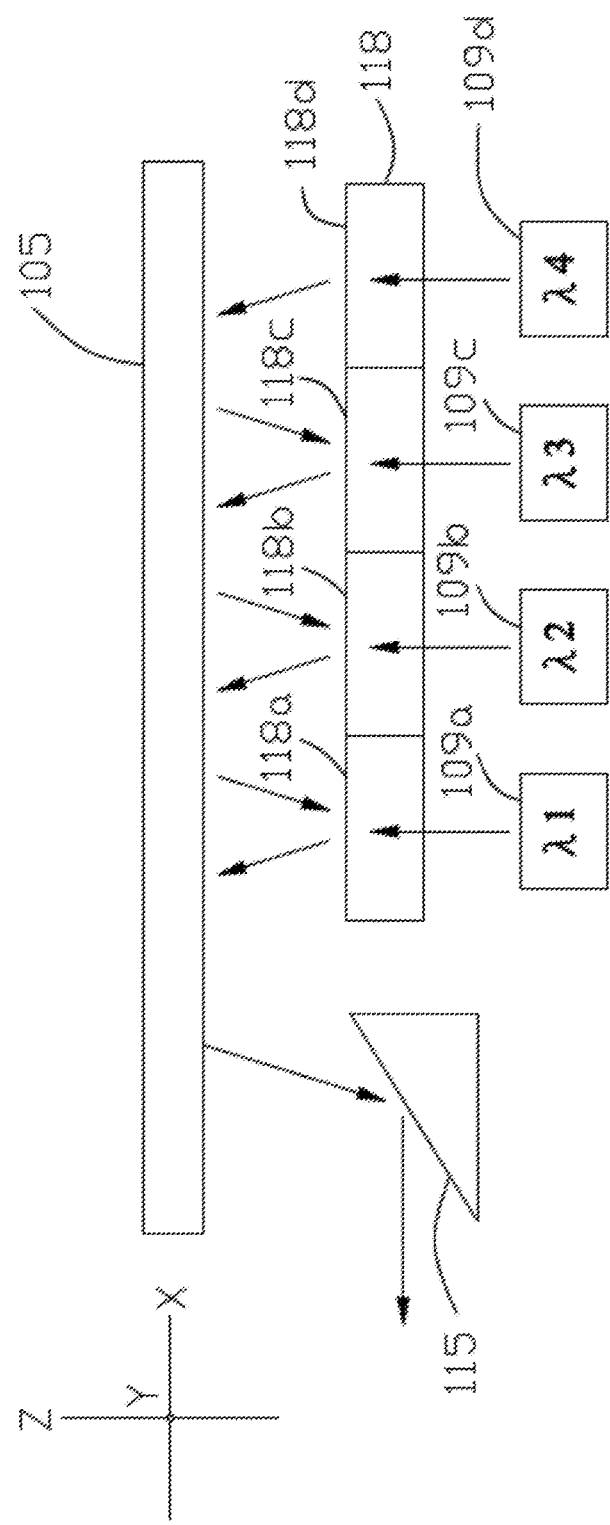
FIG. 4 illustrates a block diagram of a portion of the optical coupling system of the WDM optical transmitter module shown in FIG. 2 and shows the manner in which the optical coupling system operates on light to perform wavelength division multiplexing.

FIG. 4 illustrates a block diagram of a portion of the optical coupling system of the WDM optical transmitter module 100A shown in FIG. 2 that will be used to demonstrate the manner in which the filter block 118, the mirror 105 and the second optical element 115 integrally formed in the unibody 101A operate on the light beams emitted by the VCSELs 109*a*-109*d* to perform WDM. For ease of discussion, the first set of optical elements 114 and the optical effects provided by them are not depicted in FIG. 4. The filter block 118, in accordance with this representative embodiment, has four filters 118*a*-118*d* disposed on a top surface thereof. Filter 118*a* passes light of wavelength λ1 emitted by VCSEL 109*a* and reflects light of wavelengths λ2-λ4 emitted by VCSELs 109*b*-109*d*, respectively. Filter 118*b* passes light of wavelength λ2 emitted by VCSEL 109*b* and reflects light of wavelengths λ3 and λ4 emitted by VCSELs 109*c* and 109*d*, respectively. Filter 118*c* passes light of wavelength λ3 emitted by VCSEL 109*c* and reflects light of wavelength λ4 emitted by VCSEL 109*d*. Filter 118*d* passes light of wavelength λ4 emitted by VCSEL 109*d*. It should be noted that although the VCSELs 109*a*-109*d* are depicted in FIGS. 2 and 4 as being contained on respective individual VCSEL chips, they could instead be contained in a VCSEL array chip, i.e., a chip having four VCSELs integrated therein.

The light that passes through the filters 118*a*-118*d* and that is reflected by the filters 118*a*-118*d* is incident on the mirror 105 and is reflected by it. The light of wavelength λ1 that passes through filter 118*a* and the light of wavelengths λ2-λ4 reflected by filter 118*a* is incident on the mirror 105 and is reflected by it onto the second optical element 115, which, in accordance with this representative embodiment, is a 45° mirror. The 45° mirror 115 couples the light of wavelengths λ1-λ4 into the end of an optical fiber cable (not shown) that is mated with the optical port 102 (FIG. 2). It should be noted that while the filters 118*a*-118*d* are shown has being part of the same filter block 118, filter elements that are separate from one another may instead be used. The filters that are used for this purpose are typically thin-film filter coatings, although any suitable filter element may be used for this purpose.

In accordance with a preferred embodiment, the wavelengths λ1-λ4 are within a range of from about 840 nm to about 950 nm, although the inventive principles and concepts are not limited to using light of any particular wavelengths or wavelength ranges. Using this wavelength range allows lower-cost VCSELs to be used as the light sources. Additionally, the WDM optical transmitter module 100A achieves low optical loss, high signal isolation, low back reflection, and low MPN, which allows the module 100A to be used with MMF instead of SMF to achieve further cost reductions, although the module 100A is not limited to being used with MMF.

Figure 5:
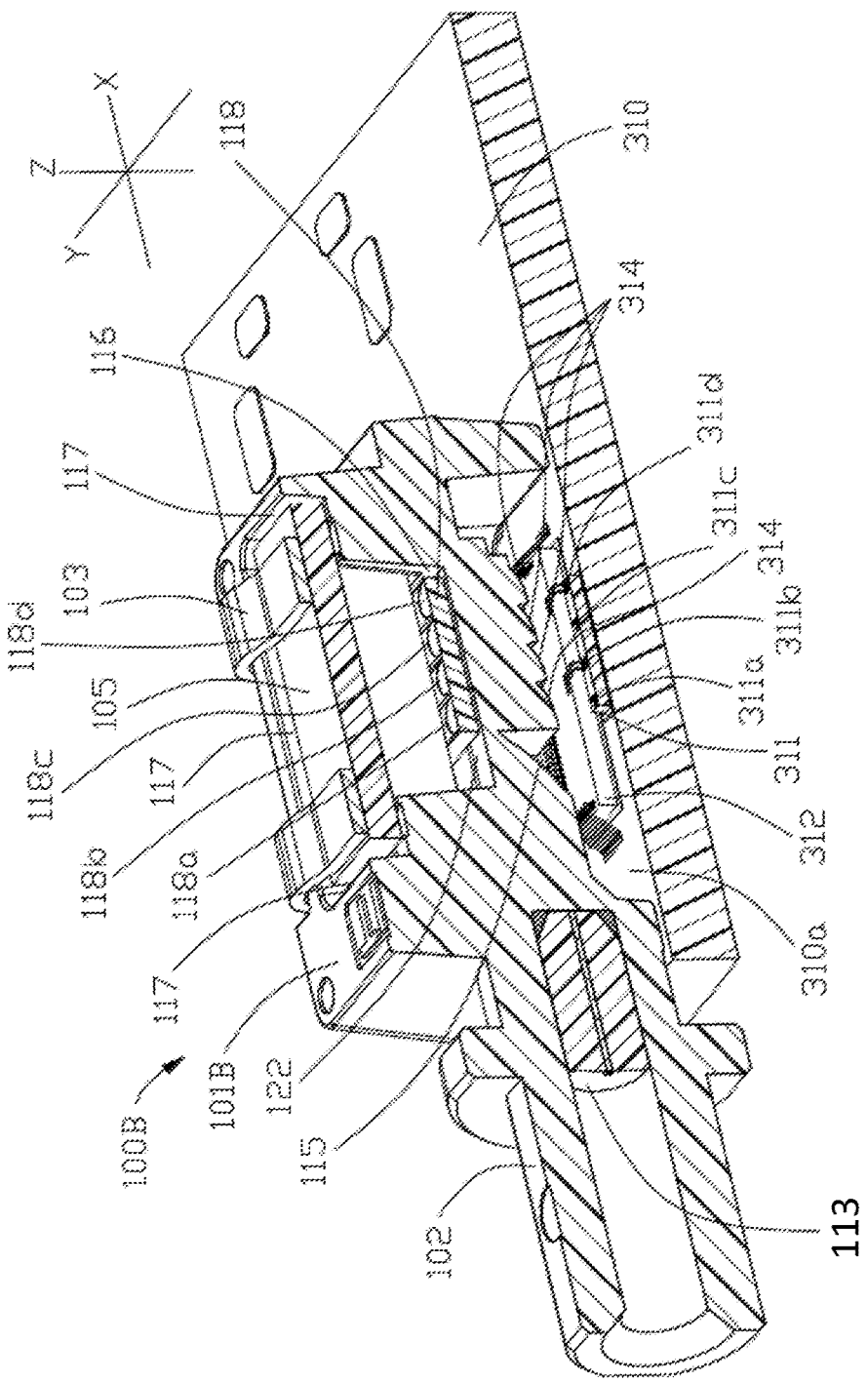
FIG. 5 illustrates a cross-sectional perspective view of the WDM optical communications module shown in FIG. 1 configured as a WDM optical receiver module.

FIG. 5 illustrates a cross-sectional perspective view of the WDM optical communications module shown in FIG. 1 configured as a WDM optical receiver module 100B. In FIG. 5, the flex circuit 108 shown in FIG. 2 has been replaced by a PCB 310 and the mounting base 106 shown in FIG. 2 has been eliminated. In accordance with this representative embodiment, a top surface 310*a* of the PCB 310 has an optical detector array chip 311 mounted on it that has four optical detectors 311*a*-311*d* integrated therein that detect light of four different wavelengths, λ1, λ2, λ3 and λ4, respectively. It should be noted that the optical detectors 311*a*-311*d* could instead be contained on respective individual photodetector chips. The optical detector array chip 311 is mounted at a precise, preselected location on the top surface 310*a* of the PCB 310. Likewise, the unibody 101B is mounted at a precise, preselected location on the top surface 310*a* of the PCB 310. In the representative embodiment shown in FIG. 5, a transimpedance amplifier (TIA) IC chip 312 and a receiver IC chip (not visible in FIG. 5) are also mounted on the top surface 310*a* of the PCB 310 and the TIA chip 312 is electrically coupled with the optical detector array chip 311 via bond wires.

The optical detector array chip 311 and other components (e.g., resistors, capacitors, the receiver IC chip, the TIA IC chip 312, etc.) that are mounted on the PCB 310 are typically mounted using a known pick-and-place process and system in combination with a machine vision system and process that use fiducials (not shown) to mount the chips 311, 312 and any other components at precise locations and with precise orientations on the PCB 310. Therefore, the optical detectors 311*a*-311*d* have a precise, preselected positional relationship relative to the unibody 101B and to features integrally formed in the unibody 101B. The optical detector array chip 311 and the unibody 101B are typically secured to the PCB 310 via an adhesive material, such as epoxy, for example.

In accordance with this representative embodiment, the optical port 102 of the unibody 101B has an optical fiber stub 113 disposed therein that abuts the end of the optical fiber cable (not shown) that is mated with the optical port 102. In other embodiments, the optical fiber stub 113 is not used. The unibody 101B shown in FIG. 5 is identical to the unibody 101A shown in FIG. 2 except that the first set of optical elements 114 of the unibody 101A has been replaced in the unibody 101B with a first set of optical elements 314 that are integrally formed in the unibody 101B. In accordance with this representative embodiment, the optical elements 314 are refractive lenses that tilt the respective light beams and focus them on the respective optical detectors 311a-311d. Thus, the unibody 101B has the first and second sets of passive alignment features 116 and 117, respectively, integrally formed therein that are used to passively align the filter block 118 and the mirror 105, respectively, with the unibody 101B in X- and Y-directions of an X, Y Z Cartesian coordinate system. Likewise, the unibody 101B has the passive alignment features 121 and 122 integrally formed therein that are used to passively align the mirror 105 and the filter block 118 with the unibody 101B in the Z-direction of the X, Y Z Cartesian coordinate system. In accordance with this representative, the DOE 125 shown in FIG. 2 is not used in the WDM optical receiver module 100B. In other embodiments, the DOE 125 is used in the WDM optical receiver module 100B in place of the refractive optical elements 314.

As with the unibody 101A shown in FIG. 2, the unibody 101B shown in FIG. 5 is preferably a molded plastic piece part formed via a known plastic injection molding process. Because plastic parts formed via plastic injection molding processes can be formed very precisely, features of the unibody 101B, such as, for example, the passive alignment features 111, 116 and 117, the first set of optical elements 314 and the second optical element 115, respectively, can be integrally formed in the unibody 101B with very high precision. This allows passive alignment features such as those described above and passive alignment techniques to be used to assemble the optical coupling system of the module 100B and to achieve optical alignment between the end of the optical fiber (not shown) that is mated with the optical port 102, the optical coupling system and the VCSELs 109a-109d. The combination of the first set of optical elements 314, the second optical element 115, the filter block 118, and the mirror 105 comprise the optical coupling system of the WDM optical receiver module 100B.

Figure 6:
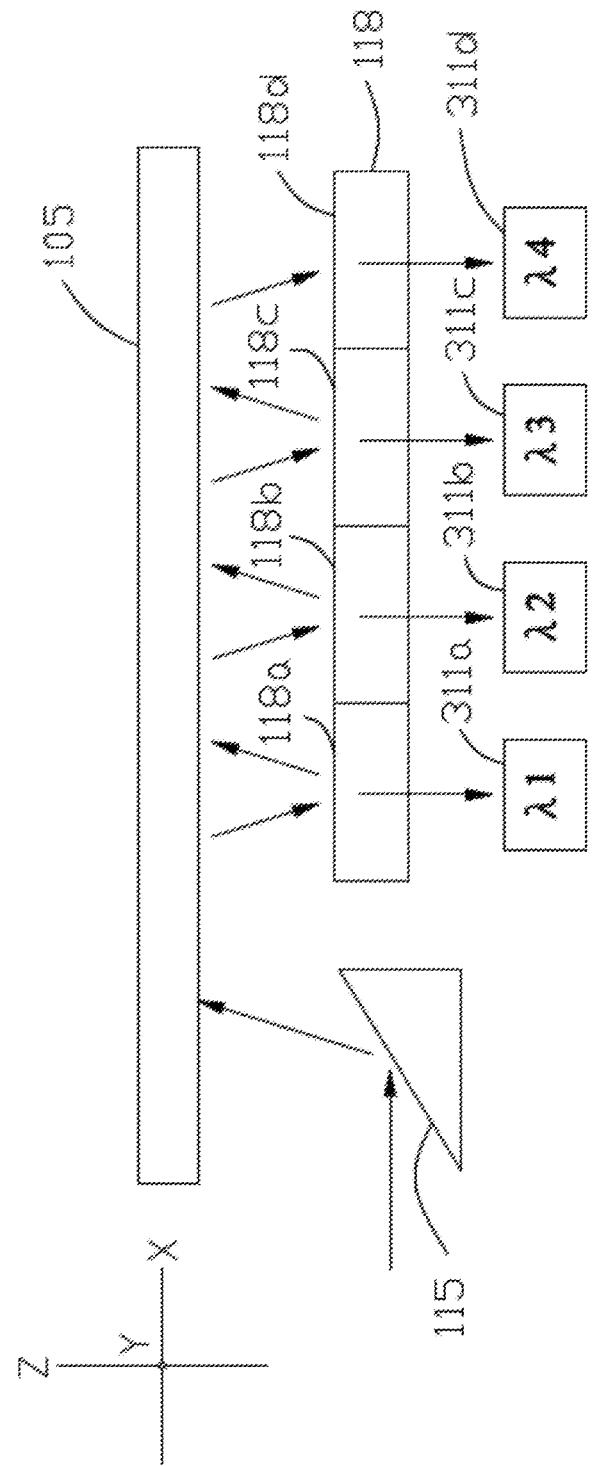
FIG. 6 illustrates a block diagram of a portion of the optical coupling system of the WDM optical receiver module shown in FIG. 5 and shows the manner in which the optical coupling system operates on light to perform wavelength division demultiplexing.

FIG. 6 illustrates a block diagram of a portion of the optical coupling system of the WDM optical receiver module 100B shown in FIG. 5 that will be used to demonstrate the manner in which the filter block 118, the mirror 105 and the second optical element 115 integrally formed in the unibody 101B operate on the light beams passing out of the end of the optical fiber cable mated with the optical port 102 to perform wavelength division demultiplexing, also abbreviated herein as "WDM." For ease of discussion, the first set of optical elements 314 and the optical effects provided by them are not depicted in FIG. 6.

The light of wavelengths λ1-λ4 received via the optical port 102 is reflected by the second optical element 115 onto the mirror 105, which reflects the light onto filter 118a. Filter 118a passes light of wavelength λ1 received via the optical port 102 and reflects light of wavelengths λ2-λ4 received via the optical port 102 onto mirror 105, which reflects the light onto filter 118b. The light of wavelength λ1 is coupled by the optical coupling system of the module 100B onto the optical detector 311a. Filter 118b passes light of wavelength λ2 received via the optical port 102 and reflects light of wavelengths λ3 and λ4 received via the optical port 102 onto mirror 105, which reflects the light onto filter 118c. The light of wavelength λ2 is coupled by the optical coupling system of the module 100B onto the optical detector 311b. Filter 118c passes light of wavelength λ3 received via the optical port 102 and reflects light of wavelength λ4 received via the optical port 311 onto mirror 105, which reflects the light onto filter 118d. The light of wavelength λ3 is coupled by the optical coupling system of the module 100B onto the optical detector 311c. Filter 118d passes light of wavelength λ4 received via the optical port 102 and the optical coupling system of the module 100B couples the light onto the optical detector 311d. In accordance with a preferred embodiment, the wavelengths λ1-λ4 are within a range of from about 840 nm to about 950 nm, although the inventive principles and concepts are not limited to using light of any particular wavelengths or wavelength ranges.

Figure 7:
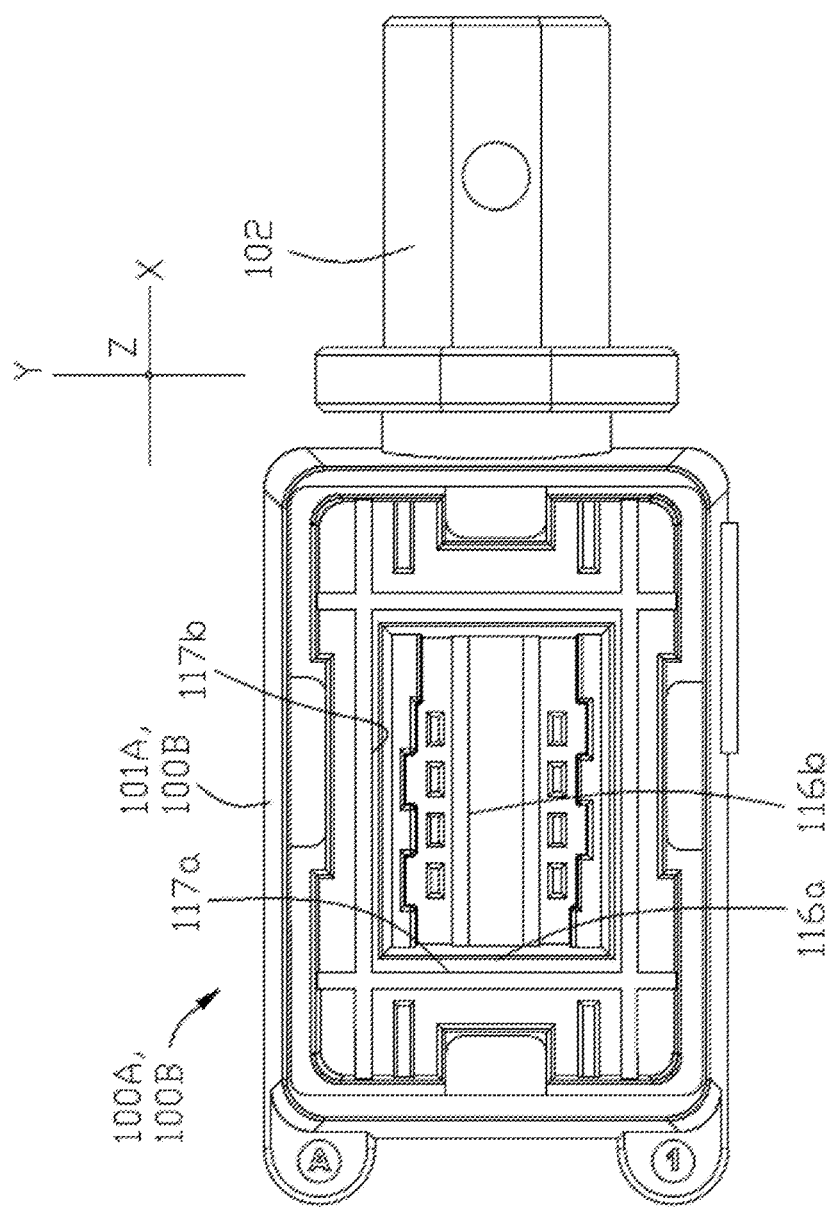
FIG. 7 illustrates a bottom plan view of the WDM optical communications module shown in FIGS. 2 and 5, which shows the first and second sets of passive alignment features that are integrally formed in the unibody of the module for aligning the filter block and the mirror of the module with the unibody.

FIG. 7 illustrates a bottom plan view of the WDM optical communications module 100A and 100B shown in FIGS. 2 and 5, respectively, that shows the first and second sets of passive alignment features 116 and 117, respectively, that are integrally formed in the unibody 101A, 100B. As indicated above, the first and second sets of passive alignment features 116 and 117, respectively, are used for passively aligning the filter block 118 (FIGS. 2 and 5) and the mirror 105 (FIGS. 2 and 5) with the unibody 100A, 100B in the X- and Y-directions. In accordance with this representative embodiment, the first set of passive alignment features 116 includes first and second inner side walls 116a and 116b, respectively, integrally formed in the unibody 100A, 100B that abut first and second adjacent sides (not shown) of the filter block 118, thereby acting as hard stops that restrict movement of the filter block 118 in the X- and Y-directions. Likewise, in accordance with this representative embodiment, the second set of passive alignment features 117 includes third and fourth inner side walls 117a and 117b, respectively, integrally formed in the unibody 100A, 100B that abut first and second sides (not shown) of the mirror 105, thereby acting as hard stops that restrict movement of the mirror 105 in the X- and Y-directions.

It should be noted that a variety of passive alignment features can be formed in the unibody 100A, 100B for this purpose and that the inventive principles and concepts are not limited with respect to the shape, size, position or number of passive alignment features that are integrally formed in the unibody 100A, 100B for this purpose, as will be understood be persons of skill in the art in view of the description provided herein. Likewise, a variety of passive alignment features can be formed in or disposed on the filter block 118 and the mirror 105 for engaging the respective passive alignment features of the unibody 100A, 100b in order to achieve passive alignment of the filter block 118 and mirror 105 with the unibody 100A, 100B.

Figure 8:
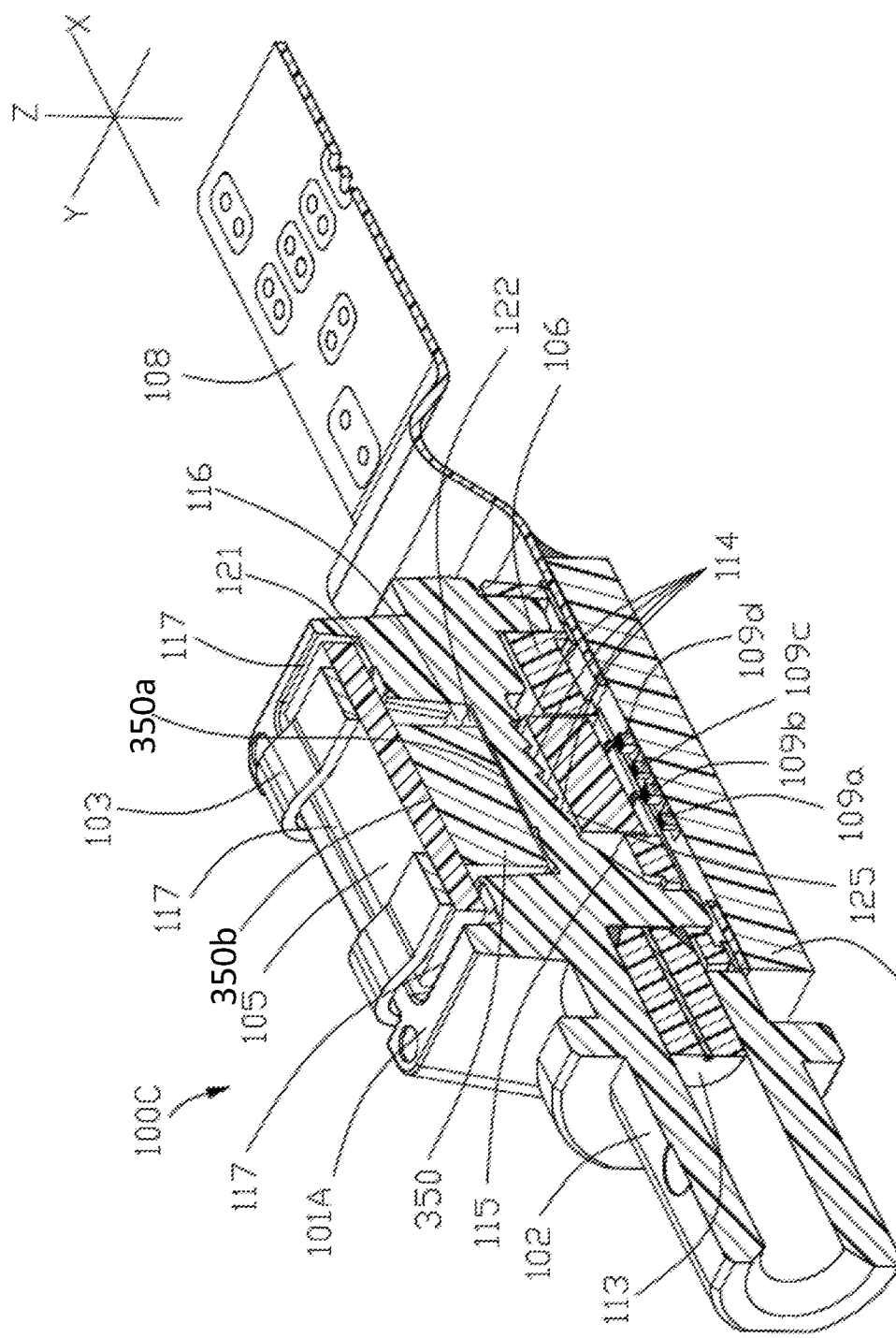
FIG. 8 illustrates a cross-sectional perspective view of a WDM optical transmitter module that is a modification of the WDM optical transmitter module shown in FIG. 2.

The WDM optical communication module configurations described above with reference to FIGS. 1-7 can be varied in a number of ways without deviating from the inventive principles and concepts. For example, FIG. 8 illustrates a cross-sectional perspective view of a WDM optical transmitter module 100C that is a modified version of the WDM optical transmitter module 100A shown in FIG. 2. In particular, in accordance with this representative embodiment, the optical coupling system of the module 100A shown in FIG. 2 has been modified to include a glass substrate 350 that performs the optical functions performed by the mirror 105 and the filter block 118 shown in FIG. 2. In accordance with this representative embodiment, the block 105 is a fixing plate. The fixing clip 103 exerts a downward force on the fixing plate 105, which, in turn, exerts a downward force on the glass substrate 350 to hold the glass substrate 350 in a precise, preselected X, Y Z position.

In accordance with this representative embodiment, the unibody 101A shown in FIG. 8 is identical in all respects to the unibody 100A shown in FIG. 2. The same passive alignment features 116 and 122 that are used in the unibody 100A shown in FIG. 2 to passively align the filter block 118 with the unibody 101A are used in the unibody 101A shown in FIG. 8 to passively align the glass substrate 350 with the unibody 101A. The glass substrate 350 has a top surface comprising a filter side 350a and a bottom surface comprising a mirror side 350b. The filter side 350a and the mirror side 350b perform the same filtering and mirroring operations, respectively, that are performed by the filter block 118 and the mirror 105, respectively, as described above with reference to FIGS. 2 and 4. The mirror side 350b may comprise any type of surface that has the necessary reflectivity for the operational wavelengths λ1-λ4, including, for example, Bragg reflectors, metallic reflectors and reflective coatings. The filter side 350a may comprise any type of surface that has the necessary filtering characteristics, but typically comprises thin-film coatings.

Figure 9:
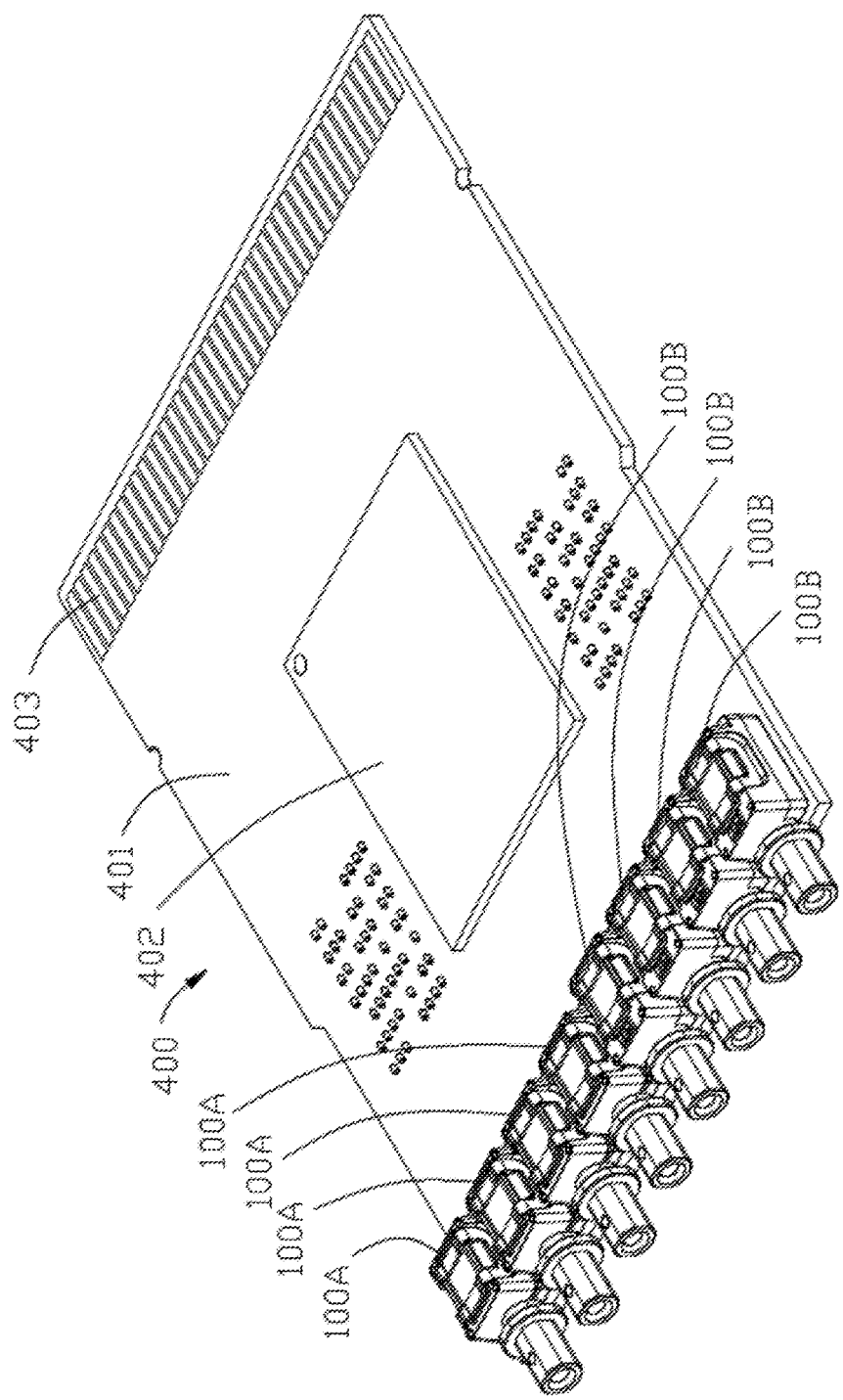
FIG. 9 illustrates a top perspective view of a multi-channel WDM optical transceiver system in accordance with a representative embodiment having four of the WDM optical transmitter modules shown in FIG. 2 and four of the WDM optical receiver modules shown in FIG. 5 edge mounted on an edge of a system printed circuit board.

FIG. 9 illustrates a top perspective view of a multi-channel WDM optical transceiver system 400 in accordance with a representative embodiment having four of the WDM optical transmitter modules 100A shown in FIG. 2 and four of the WDM optical receiver modules 100B shown in FIG. 5 edge mounted on the edge of a system PCB 401. In FIG. 9, the system enclosure is not shown, but the multi-channel WDM optical transceiver system 400 is typically contained in some type of metal enclosure or housing through which the optical ports 102 extend to make them accessible to mate with respective ends of respective optical fiber cables (not shown). The system PCB 410 has a controller IC chip 402 mounted thereon, which may be, for example, a combined VCSEL driver, TIA and receiver IC chip. The controller IC chip 402 is electrically coupled with the electrical circuitry of the modules 100A and 100B via electrically-conductive traces (not shown) that extend through the system PCB 401. The controller IC chip 402 is electrically coupled via electrically-conductive traces of the system PCB 401 to electrical contacts 403 disposed on an edge of the system PCB 401, which are used to electrically connect the multi-channel WDM optical transceiver system 400 to external circuitry (not shown).

Each of the WDM optical transmitter modules 100A wavelength division multiplexes four optical signals of four different wavelengths, λ1-λ4, over a respective optical fiber. Each of the WDM optical receiver modules 100B wavelength division demultiplexes four optical signals of four different wavelengths, λ1-λ4, passing out of an end of a respective optical fiber. Therefore, if each wavelength carries a 25 Gigabit per second (Gbps) optical signal, then the system 400 is capable of simultaneously transmitting 400 Gbps over four optical fibers and receiving 400 Gbps over for optical fibers. As indicated above, the optical fibers can be MMFs, which typically are not used in WDM optical communications systems.

It should be noted that the WDM optical transmitter module 100A shown in FIG. 2 can be converted into a BiDi WDM optical transceiver module by replacing at least one and no more than three of the VCSELs 109a-109d with an optical detector that detects a wavelength that is different from the wavelengths being transmitted by the other VCSELs. Similarly, the WDM optical receiver module 100B shown in FIG. 5 can be converted into a BiDi WDM optical transceiver module by replacing at least one and no more than three of the optical detectors 311a-311d with a VCSEL that emits a wavelength that is different from the wavelengths being detected by the other optical detectors.

Figure 10:
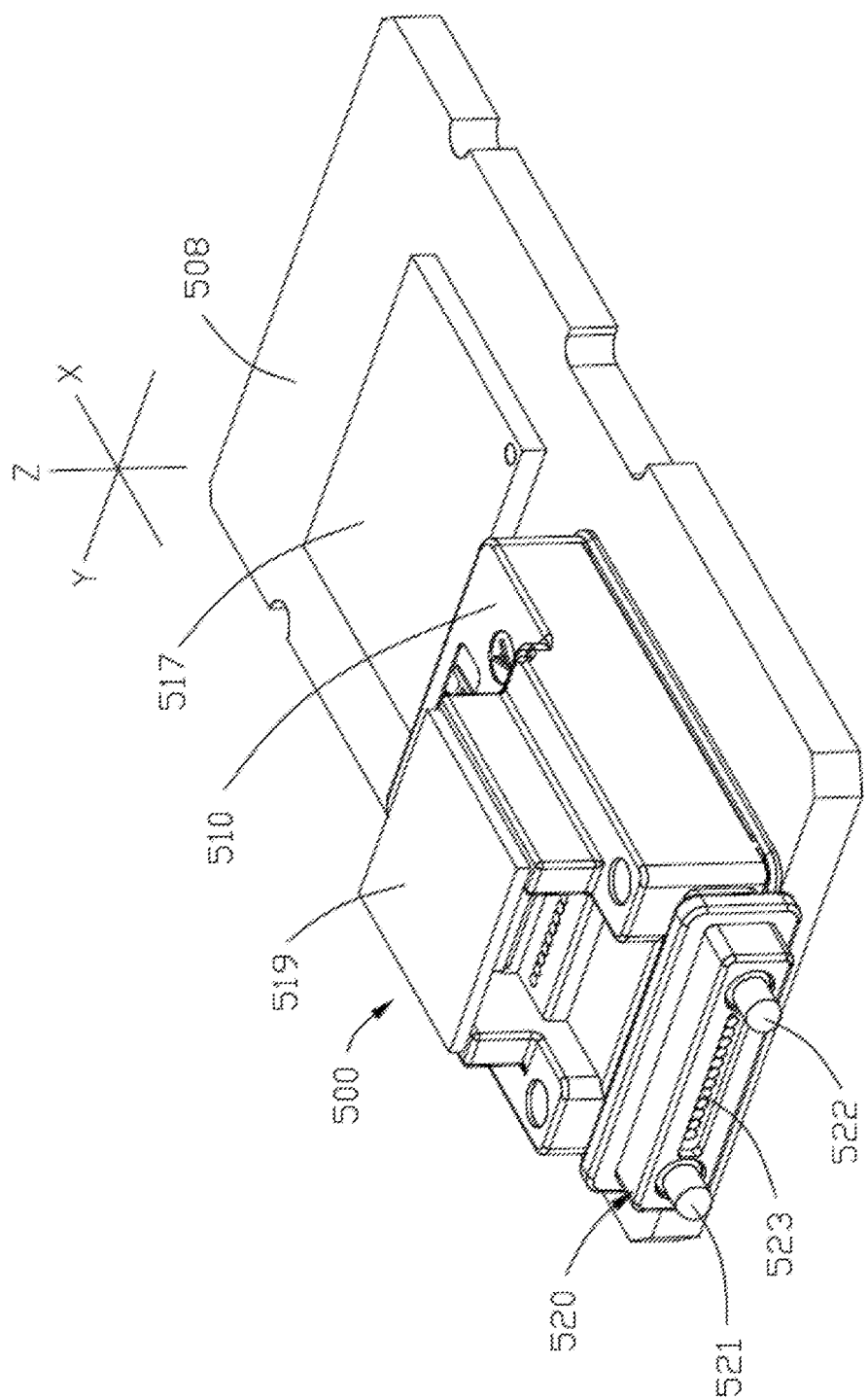
FIG. 10 illustrates a side perspective view of a multi-channel WDM optical transmitter module in accordance with a representative embodiment having twelve transmit channels.
Figure 11:
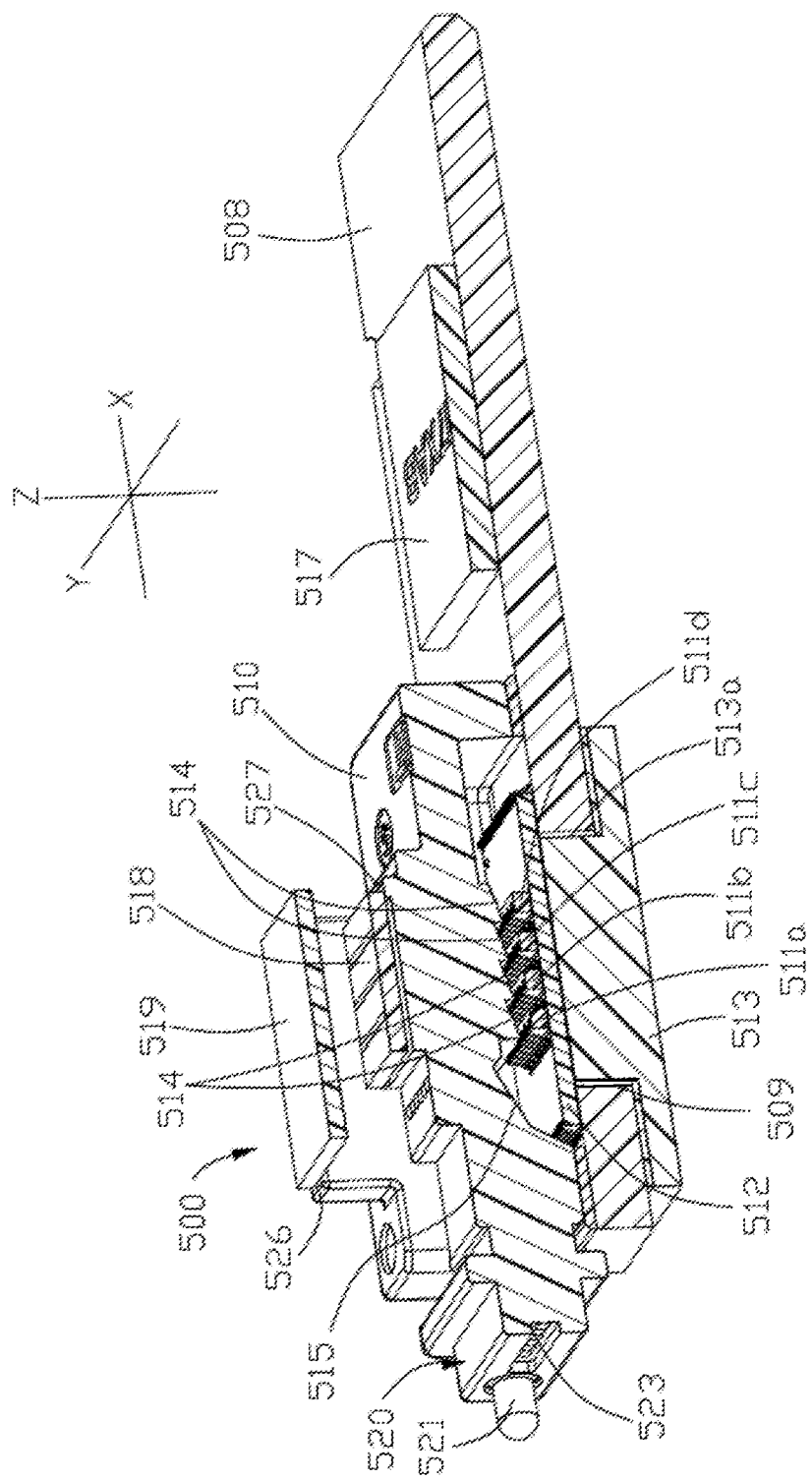
FIG. 11 illustrates a side cross-sectional view of the multi-channel WDM optical communications module shown in FIG. 10.

FIG. 10 illustrates a side perspective view of a multi-channel WDM optical transmitter module 500 in accordance with a representative embodiment having twelve transmit channels. FIG. 11 illustrates a side cross-sectional view of the multi-channel WDM optical communications module 500 shown in FIG. 10. In accordance with this illustrative embodiment, the module 500 has a unibody 510 that is a unitary piece part having passive alignment features and optical elements integrally formed therein. The module 500 has an optical coupling system comprising a first set of optical elements 514, a second optical element 515, a filter block 518 and a mirror 519. The module 500 has four one-by-ten VCSEL arrays 511a-511d mounted on a substrate 512 that is electrically coupled with a PCB 508 of the module 500. The substrate 512 is mounted on a mounting block 513 having an upper portion 513a that is shaped and sized to mate with an opening 509 formed in the PCB 508. The mounting block 513 is typically made of a thermally-conductive material, such as copper, for example, to enable it to act as a heat dissipation block for dissipating heat generated by the VCSEL arrays 511a-511d.

In accordance with this representative embodiment, bond wires 516 are used to electrically couple the VCSEL arrays 511a-511d to the substrate 512 and to electrically couple the substrate 512 to the PCB 508. In accordance with this embodiment, a controller IC chip 517 is mounted on and electrically connected to the PCB 508. The controller IC chip includes driver circuitry for driving the VCSELs of the VCSEL arrays 511a-511d.

The main difference between the unibody 101A shown in FIG. 2 and the unibody 510 shown in FIGS. 10 and 11 is that the unibody 510 is larger in the Y-direction than the unibody 100A to accommodate an increase in the number of channels that the module 500 has compared to the single-channel module configuration shown in FIG. 2. In accordance with this representative embodiment, the unibody 510 has a front portion 520 that is adapted to couple with a Multi-fiber Push-On/Pull-Off (MPO) connector. The front portion 520 has first and second pins 521 and 522, respectively, integrally formed thereon that are shaped, sized and positioned to mate with complementarily shaped, sized and positioned holes formed in a front portion of a ten-channel MPO connector (not shown). The front portion 520 has a linear array of twelve lenses 523 integrally formed therein that axial align with a similar linear array of lenses of the MPO connector (not shown) with which the unibody 510 mates.

The first set of optical elements 514 is similar to the first set of optical elements 114 described above with reference to FIG. 2 except that the first set of optical elements 514 extends in the Y-direction across twelve optical pathways corresponding to the twelve channels of the module 500. Likewise, the second optical element 515 is similar to the second optical element 115 described above with reference to FIG. 2 except that the second optical element 515 extends in the Y-direction across the twelve optical pathways corresponding to the twelve channels. Likewise, the filter block 518 is similar to the filter block 118 described above with reference to FIG. 2 except that the filter block 518 extends in the Y-direction across the twelve optical pathways corresponding to the twelve channels. Likewise, the mirror 519 is similar to the mirror 105 described above with reference to FIG. 2 except that the mirror 519 extends in the Y-direction across twelve optical pathways corresponding to the twelve channels.

As with the embodiments described above with reference to FIGS. 2 and 5, the unibody 510 has first and second sets of passive alignment features (not shown) integrally formed therein for passively aligning the filter block 518 and the mirror 519, respectively, with the unibody 510 in the X- and Y-directions. The first and second sets of passive alignment features may be, for example, walls integrally formed in the unibody 510 that abut sides of the filter block 518 and the mirror 519, respectively, to restrict their movement in the X- and Y-directions. Likewise, as with the embodiments described above with reference to FIGS. 2 and 5, the unibody 510 has third and fourth passive alignment features 526 and 527, respectively, integrally formed therein for passively aligning the mirror 519 and the filter block 518 with the unibody 510 in the Z-direction.

Figure 12:
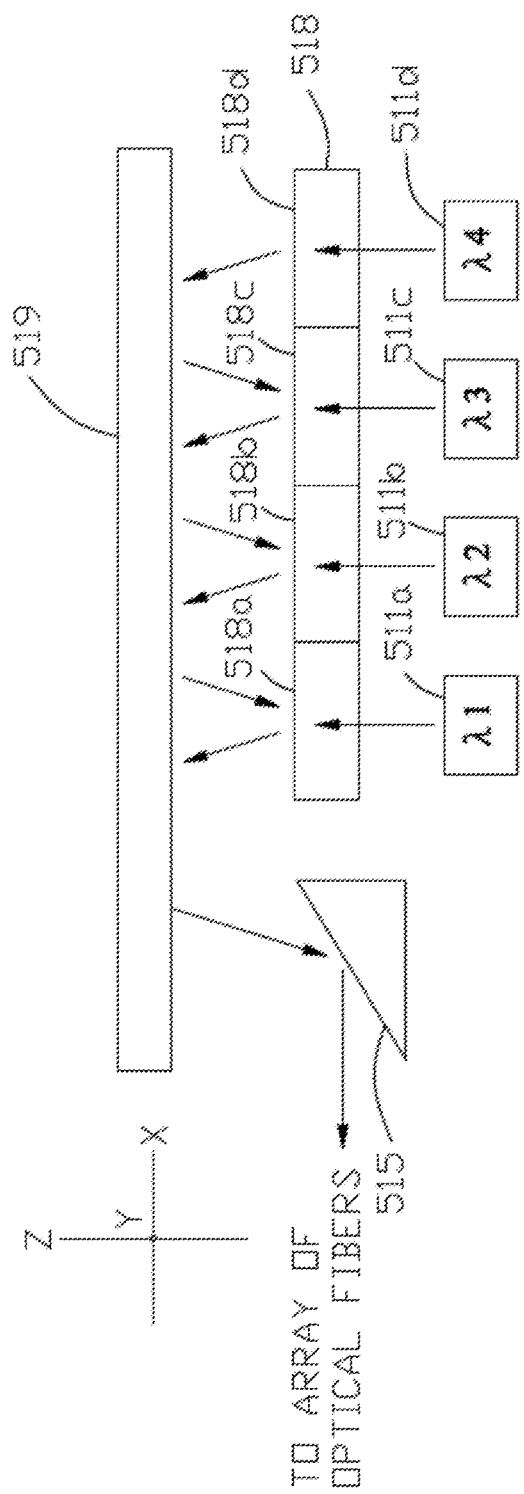
FIG. 12 illustrates a block diagram of a portion of the optical coupling system of the multi-channel WDM optical transmitter module shown in FIGS. 11 and 12 that shows the manner in which the filter block, the mirror and the second optical element integrally formed in the unibody operate on the light beams emitted by the VCSEL arrays to perform WDM over multiple channels simultaneously.

The module 500 shown in FIGS. 110 and 11 can be configured as a multi-channel WDM optical receiver module having twelve receive channels by replacing each of the VCSEL arrays 511a-511d with a respective optical detector array (not shown). Because persons of skill in the art will understand, in view of the description provided herein, the manner in which such a modification may be made to the configuration of the module 500 shown in FIGS. 10 and 11 to provide a multi-channel WDM optical receiver module, a multi-channel WDM optical receiver module having such a configuration is not explicitly shown or described herein in the interest of brevity. FIG. 12 illustrates a block diagram of a portion of the optical coupling system of the multi-channel WDM optical transmitter module 500 shown in FIGS. 11 and 12 that will be used to demonstrate the manner in which the filter block 518, the mirror 519 and the second optical element 515 integrally formed in the unibody 510 operate on the light beams emitted by the VCSEL arrays 511a-511d to perform WDM over multiple channels simultaneously. For ease of discussion, the first set of optical elements 514 and the optical effects provided by them are not depicted in FIG. 12. The filter block 518, in accordance with this representative embodiment, has four filter strips 518a-518d that are aligned with the VCSEL arrays 511a-511d, respectively. The filter strips 518a-518d are typically thin-film coatings disposed on a lower surface of the filter block 518. Filter strip 518a passes light of wavelength λ1 emitted by the VCSELs of VCSEL array 511a and reflects light of wavelengths λ2-λ4 emitted by the VCSELs of VCSEL arrays 511b-511d, respectively. Filter strip 518b passes light of wavelength λ2 emitted by the VCSELs of VCSEL array 511b and reflects light of wavelengths λ3 and λ4 emitted by VCSELs of VCSEL arrays 511c and 511d, respectively. Filter strip 518c passes light of wavelength λ3 emitted by the VCSELs of VCSEL array 511c and reflects light of wavelength λ4 emitted by the VCSELs of VCSEL array 511d. Filter strip 518d passes light of wavelength λ4 emitted by the VCSELs of VCSEL array 511d.

The light that passes through the filter strips 518a-518d and that is reflected by the filter strips 518a-518d is incident on the mirror 519 and is reflected by it. The light of wavelength λ1 that passes through filter strip 518a and the light of wavelengths λ2-λ4 that is reflected by filter strip 518a is incident on the mirror 519 and is reflected by it onto the second optical element 515, which, in accordance with this representative embodiment, is a 45° mirror. The 45° mirror 515 couples the light of wavelengths λ1-λ4 into the ends of twelve optical fibers that are held in an opposing MPO connector (not shown) that is mated with the unibody 510. The light passes out of the unibody 510 through respective optical elements 523 (FIGS. 10 and 11) of the unibody 510 that are aligned with the fibers held in the opposing MPO connector. The front portion 520 of the unibody 510 may be considered the optical port of the module 500.

It should be noted that while the filter strips 518a-518d are shown as being part of the same filter block 518, filter strips that are disposed on separate filter blocks may instead be used. The VCSEL arrays 511a-511d may comprise four VCSEL chips, each having twelve VCSELs, or each of the VCSEL arrays 511a-511d may comprise twelve VCSEL chips, sometimes referred to in the art as singlets. It should also be noted that although this representative embodiment has been described with reference to a multi-channel configuration having twelve channels, the inventive principles and concepts apply to any M-channel configuration, where M is a positive integer that is greater than or equal to 2.

As indicated above, in accordance with a preferred embodiment, the wavelengths λ1-λ4 are within a range of from about 840 nm to about 950 nm, although the inventive principles and concepts are not limited to using light of any particular wavelengths or wavelength ranges. The module 500 may be used with SMF and is not limited to being used with MMF.

Figure 13:
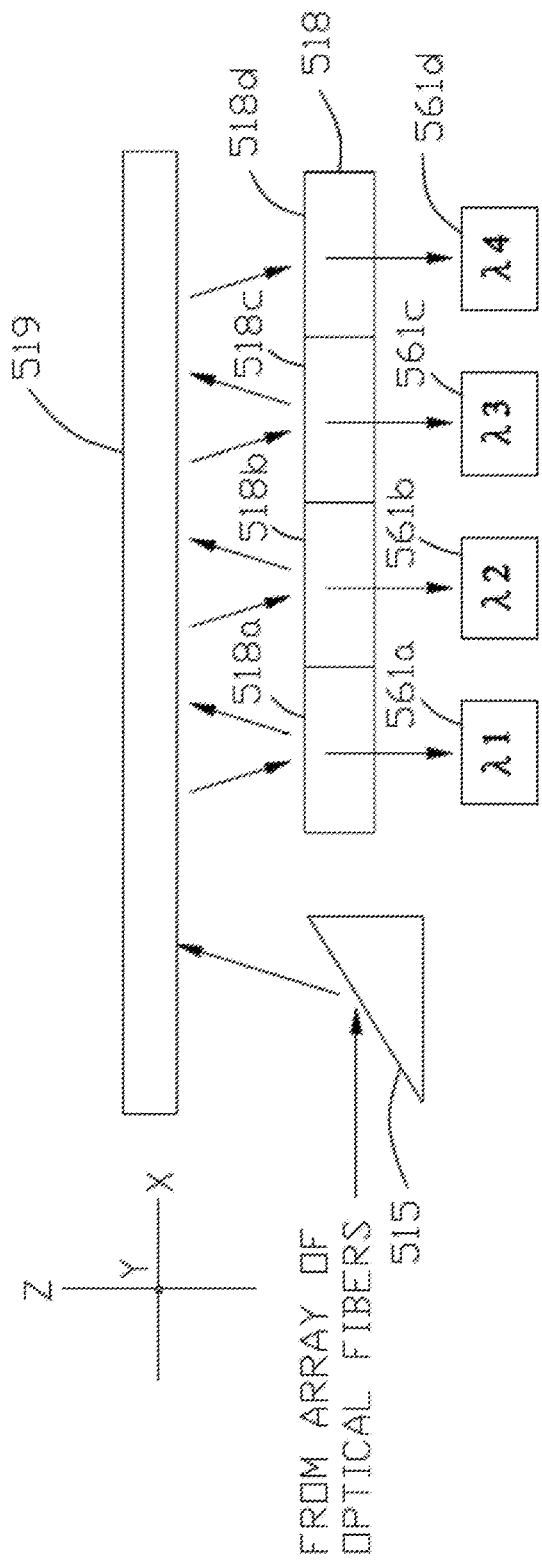
FIG. 13 illustrates a block diagram of a portion of the optical coupling system of a multi-channel WDM optical receiver module in accordance with a representative embodiment in which the module shown in FIGS. 10 and 11 is configured as an optical receiver rather than an optical transmitter.

FIG. 13 illustrates a block diagram of a portion of the optical coupling system of a multi-channel WDM optical receiver module in accordance with a representative embodiment in which the module 500 shown in FIGS. 10 and 11 is configured in the manner described above as an optical receiver rather than an optical transmitter. FIG. 13 will be used to demonstrate the manner in which the filter block 518, the mirror 519 and the second optical element 515 integrally formed in the unibody 510 operate on the light beams passing out of the ends of twelve optical fibers held in an MPO connector (not shown) that is mated with the unibody 510 to perform wavelength division demultiplexing, also abbreviated herein as "WDM." For ease of discussion, the first set of optical elements 514 and the optical effects provided by them are not depicted in FIG. 13.

The light of wavelengths λ1-λ4 that passes out of the ends of the twelve optical fibers is received via the respective optical elements 523 and reflected by the second optical element 515 onto the mirror 519, which reflects the light onto filter strip 518a. Filter strip 518a passes light of wavelength λ1 and reflects the light of wavelengths λ2-λ4 onto mirror 519, which reflects the light onto filter strip 518b. The light of wavelength λ1 is coupled by the optical coupling system of the module 500 onto respective optical detectors of a first optical detector array 561a. Filter strip 518b passes light of wavelength λ2 and reflects light of wavelengths λ3 and λ4 onto mirror 519, which reflects the light onto filter strip 518c. The light of wavelength λ2 is coupled by the optical coupling system of the module 500 onto respective optical detectors of a second optical detector array 561b. Filter strip 518c passes light of wavelength λ3 and reflects light of wavelength λ4 onto mirror 519, which reflect the light onto filter strip 518d. The light of wavelength λ3 is coupled by the optical coupling system of the module 500 onto respective optical detectors of a third optical detector array 561c. Filter strip 518d passes light of wavelength λ4 and the optical coupling system of the module 500 couples the light onto respective optical detectors of a fourth optical detector array 561d.

In accordance with the representative embodiment of FIG. 13, the wavelengths λ1-λ4 are within a range of from about 840 nm to about 950 nm and the optical fibers are MMFs, although the inventive principles and concepts are not limited to using light of any particular wavelengths or wavelength ranges or to using MMFs (i.e., SMFs may instead be used). Also, the multi-channel receiver configuration may have any number, M, of channels, where M is a positive integer that is greater than or equal to 2.

Figure 14:
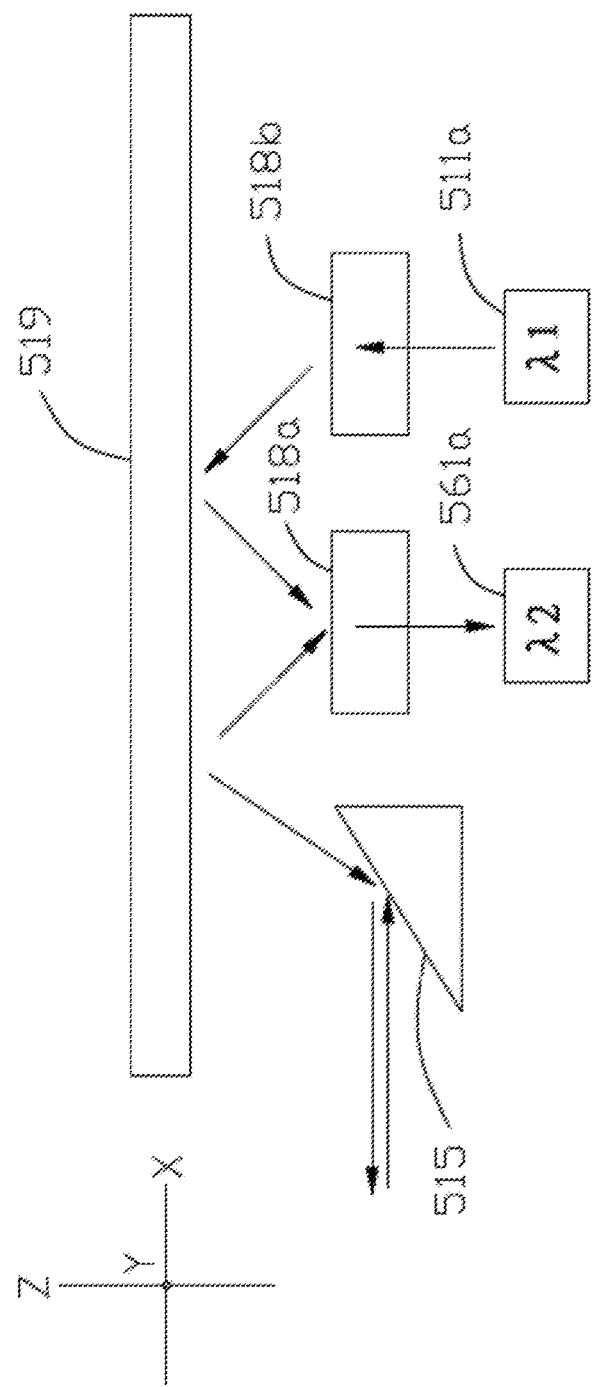
FIG. 14 illustrates a block diagram of a portion of the optical coupling system of the WDM optical transmitter module shown in FIGS. 10 and 11 where the module is configured as a multi-channel, bidirectional optical transceiver module.

The module 500 shown in FIGS. 10 and 11 may also be configured as a multi-channel, BiDi optical transceiver module by replacing at least one of the VCSEL arrays 511a-511d with an optical detector array. For example, FIG. 14 illustrates a block diagram of a portion of the optical coupling system of the WDM optical transmitter module 500 shown in FIGS. 10 and 11 where the module 500 is configured as a multi-channel, BiDi optical transceiver module. In accordance with this representative embodiment, first and second wavelengths of light, λ1 and λ2, respectively, are propagating simultaneously in opposite directions along each of the N optical fibers held in the opposing MPO connector (not shown).

The light of wavelengths λ1 and λ2 that passes out of the ends of the twelve optical fibers is received via the respective optical elements 523 and reflected by the second optical element 515 onto the mirror 519, which reflects the light onto filter strip 518a. Filter strip 518a passes light of wavelength λ1 and reflects the light of wavelength λ2 onto mirror 519, which reflects the light onto filter strip 518b. The light of wavelength λ1 is coupled by the optical coupling system of the module 500 onto respective optical detectors of the first optical detector array 561a. Filter strip 518b passes light of wavelength λ2 emitted by the VCSELs of the VCSEL array 511a, which is reflected by mirror 519 onto filter strip 518a. Filter strip 518a reflects the light of wavelength λ2 back onto mirror 519, which reflects the light onto the second optical element 515. The second optical element 515, which is a 45° mirror in this embodiment, reflects the light toward to optical elements 523, which couple the light into the ends of the respective optical fibers held in the opposing MPO connector (not shown).

For ease of illustration and discussion, FIG. 14 depicts only two wavelengths being transmitted and received over each of the N optical fibers. It should be noted, however, that any number, P, of different wavelengths may be simultaneously transmitted and received over each channel in the multi-channel, BiDi configuration represented by FIGS. 10, 11 and 14, where P is a positive integer that is greater than or equal to 2.

It should be noted that illustrative embodiments have been described herein for the purpose of demonstrating principles and concepts of the invention. As will be understood by persons of skill in the art in view of the description provided herein, many modifications may be made to the embodiments described herein without deviating from the scope of the invention. For example, while FIG. 8 shows a single-channel optical communications module 100C, the optical communications module 100C may have multiple channels, in which case the DOE 125 either has multiple respective diffractive patterns formed therein for operating on the different optical signals or multiple DOEs having respective diffractive patterns formed therein are arrayed to operate on the different optical signals. Also, although the light sources have been described as being VCSELs, any suitable light sources may be used for this purpose, including edge-emitting lasers and light emitting diodes (LEDs). These and many other modifications may be made within the scope of the inventive principles and concepts, as will be understood by those of skill in the art.

What is claimed is:

1. An optical communications module having wavelength division multiplexing (WDM) capability for multiplexing a plurality of light beams of a plurality of different wavelengths onto an end of at least one optical waveguide of at least one optical cable, the optical communications module comprising:
    an integrally-formed optical unibody comprising an optical material that is transmissive to light of N different wavelengths, where N is a positive integer that is greater than or equal to 2, the unibody comprising:
        an optical port integrally formed in the unibody, the optical port being adapted to couple with an end of the optical cable or with a ferrule disposed on the end of the optical cable;
        at least first and second sets of passive alignment features integrally formed in the unibody;
        at least a first set of N optical elements integrally formed in the unibody; and
        at least a second optical element integrally formed in the unibody, wherein the first and second sets of passive alignment features are used to passively align one or more optical components with the unibody in at least first and second directions, wherein the first set of N optical elements, the second optical element and said one or more optical components together comprise an optical coupling system of the optical communications module and are arranged to multiplex N light beams of N respective different wavelengths of light into the optical port for transmission over the optical cable.

2. The optical communications module of claim 1, further comprising:
    a substrate mechanically coupled with the unibody in alignment with the unibody in at least the first and second directions; and
    N light sources disposed on an upper surface of the substrate in alignment with N respectively optical elements of the first set of N optical elements, the N light sources emitting the N light beams, respectively, of the N respective different wavelengths, wherein said one or more optical components of the optical coupling system include at least a first optical component having at least first and second passive alignment features that are engaged with first and second passive alignment features, respectively, of the first set of passive alignment features integrally formed in the unibody, the engagement of the first and second passive alignment features of the first optical component with the first and second passive alignment features of the first set of passive alignment features integrally formed in the unibody aligning the first optical component with the unibody in at least the first and second directions.

3. The optical communications module of claim 2, wherein the first optical component includes N filters disposed on a bottom surface of the first optical component and a mirror disposed on a top surface of the first optical component that is opposite and substantially parallel to the bottom surface of the first optical component, the bottom surface of the first optical component being disposed in between the top surface of the first optical component and the N light sources, each of the N filters passing a respective one of the N light beams of the N respective different wavelengths emitted by the N respective light sources, wherein the N light beams of the N respective different wavelengths are coupled by the N filters onto the mirror, the mirror reflecting the N light beams of the N respective different wavelengths coupled onto the second optical element integrally formed in the unibody, the second optical element coupling the N light beams of the N respective different wavelengths into the optical port.

4. The optical communications module of claim 2, wherein said one or more optical components further includes at least a second optical component having first and second passive alignment features that are engaged with third and fourth passive alignment features, respectively, of the second set of passive alignment features, the engagement of the first and second passive alignment features of the second optical component with the third and fourth passive alignment features of the second set of passive alignment features aligning the second optical component with the unibody in at least the first and second directions.

5. The optical communications module of claim 4, wherein the first and second optical components comprise a filter block and a mirror, respectively, the filter block having N filter coatings comprising the N filters disposed on a top surface of the filter block, the mirror reflecting the N light beams of the N respective different wavelengths that are coupled by the N filters onto the mirror onto the second optical element integrally formed in the unibody, the second optical element coupling the N light beams of the N respective different wavelengths into the optical port.

6. The optical communications module of claim 4, wherein the first optical component comprises N filter blocks and the second optical component comprises a mirror, the N filter blocks having N filter coatings, respectively, comprising the N filters on respective top surfaces thereof, the mirror reflecting the N light beams of the N respective different wavelengths that are coupled by the N filters onto the mirror onto the second optical element integrally formed in the unibody, the second optical element coupling the N light beams of the N respective different wavelengths into the optical port.

7. The optical communications module of claim 1, wherein said at least one optical waveguide comprises a single optical fiber.

8. The optical communications module of claim 1, wherein said at least one optical waveguide comprises M optical fibers, where M is a positive integer that is greater than or equal to 2, and wherein the unibody has a front portion that is adapted to couple with a Multi-fiber Push-On/Pull-Off (MPO) connector that holds ends of the M optical fibers, the front portion of the unibody having first and second pins extending therefrom that are shaped, sized and positioned to mate with complementarily shaped, sized and positioned holes disposed in a front portion of the MPO connector, the front portion of the unibody comprising the optical port and having a linear array of M lenses disposed therein that are axially aligned with the ends of the M optical fibers held in the MPO connector when the MPO connector and the front portion of the unibody are coupled together, and wherein the first set of N optical elements, the second optical element and said one or more optical components that together comprise the optical coupling system are arranged to couple N light beams of N respective wavelengths of light onto each of the M lenses.

9. The optical communications module of claim 1, wherein said at least one optical waveguide comprises M optical fibers, where M is a positive integer that is greater than or equal to 2, and wherein the unibody has a front portion that is adapted to couple with a Multi-fiber Push-On/Pull-Off (MPO) connector that holds ends of the M optical fibers, the front portion of the unibody having first and second holes that are shaped, sized and positioned to mate with complementarily shaped, sized and positioned pins that extend from a front portion of the MPO connector, the front portion of the unibody comprising the optical port and having a linear array of M lenses disposed therein that are axially aligned with the ends of the M optical fibers held in the MPO connector when the MPO connector and the front portion of the unibody are coupled together, and wherein the first set of N optical elements, the second optical element and said one or more components that together comprise the optical coupling system are arranged to couple N light beams of N respective wavelengths of light onto each of the M lenses.

10. The optical communications module of claim 2, wherein the N optical elements of the first set of N optical elements tilt the N light beams, respectively, emitted by the N light sources, respectively, and direct the tilted light beams toward a bottom surface of the first optical component.

11. The optical communications module of claim 10, wherein the N optical elements of the first set of N optical elements also collimate, or nearly collimate, the N light beams, respectively.

12. The optical communications module of claim 2, wherein said at least one optical waveguide is a multimode optical fiber, and wherein the N different wavelengths range from about 840 nanometers (nm) to about 950 nm.

13. The optical communications module of claim 2, further comprising:
a diffractive optical element (DOE) mechanically coupled with the unibody and positioned in between N light sources and the first optical component, the DOE receiving the N light beams of N respective different wavelengths emitted by the N light sources, respectively, and coupling the N light beams of N respective different wavelengths onto the N optical elements, respectively, of the first set of N optical elements, wherein the DOE reduces mode partition noise and back reflection of light of the N respective different wavelengths onto the N light sources.

14. An optical communications module having wavelength division demultiplexing (WDM) capability for demultiplexing a light beam comprising a plurality of different wavelengths into a plurality of light beams of respective different wavelengths, the optical communications module comprising:
an integrally-formed optical unibody comprising an optical material that is transmissive to light of N different wavelengths, where N is a positive integer that is greater than or equal to 2, the unibody comprising:
an optical port integrally formed in the unibody, the optical port being adapted to couple with an end of an optical cable or with a ferrule disposed on the end of the optical cable, the optical cable having at least one optical waveguide;
at least first and second sets of passive alignment features integrally formed in the unibody;
at least a first set of N optical elements integrally formed in the unibody; and
at least a second optical element integrally formed in the unibody, wherein the first and second sets of passive alignment features are used to passively align one or more optical components with the unibody in at least first and second directions, wherein the first set of N optical elements, the second optical element and said one or more optical components together comprise an optical coupling system of the optical communications module and are arranged to demultiplex a light beam comprising N different wavelengths received in the optical port from an end of said at least one optical waveguide into N light beams of N respective different wavelengths.

15. The optical communications module of claim 14, further comprising:
a substrate mechanically coupled with the unibody in alignment with the unibody in at least the first and second directions; and
N optical detectors disposed on an upper surface of the substrate in alignment with N respectively optical elements of the first set of N optical elements, the N optical detectors detecting the N light beams, respectively, of the N different wavelengths, respectively, coupled onto the N optical detectors by N respective optical elements of the first set of N optical elements, wherein said one or more optical components of the optical coupling system include at least a first optical component having at least first and second passive alignment features that are engaged with first and second passive alignment features, respectively, of the first set of passive alignment features integrally formed in the unibody, the engagement of the first and second passive alignment features of the first optical component with the first and second passive alignment features of the first set of passive alignment features aligning the first optical component with the unibody in at least the first and second directions.

16. The optical communications module of claim 15, wherein the first optical component includes N filters disposed on a bottom surface of the first optical component and a mirror disposed on a top surface of the first optical component that is opposite and substantially parallel to the bottom surface of the first optical component, the bottom surface of the first optical component being disposed in between the top surface of the first optical component and the optical detectors, the second optical element reflecting the light beam comprising the N different wavelengths onto the mirror, the mirror reflecting the light beam comprising the N different wavelengths onto the N filters, wherein the N filters demultiplex the light beam comprising N different wavelengths into N light beams of N different wavelengths, respectively, and couples the N light beams onto the N optical elements of the first set of N optical elements.

17. The optical communications module of claim 15, wherein said one or more optical components further includes at least a second optical component having first and second passive alignment features that are engaged with third and fourth passive alignment features, respectively, of the second set of passive alignment features, the engagement of the first and second passive alignment features of the second optical component with the third and fourth passive alignment features of the second set of passive alignment features aligning the second optical component with the unibody in at least the first and second directions.

18. The optical communications module of claim 17, wherein the first and second optical components comprise a filter block and a mirror, respectively, the filter block having N filter coatings comprising the N filters, respectively, disposed on a top surface of the filter block, the mirror reflecting the light beam comprising the N different wavelengths coupled onto the mirror by the second optical element onto the N filter coatings, respectively, wherein the N filter coatings demultiplex the light beam comprising N different wavelengths into N light beams of N different wavelengths, respectively, and couples the N light beams onto the N optical elements, respectively, of the first set of N optical elements.

19. The optical communications module of claim 17, wherein the first optical component comprises N filter blocks and the second optical component comprises a mirror, the N filter blocks having N filter coatings, respectively, comprising the N filters on respective top surfaces thereof, the mirror reflecting the N light beams of the N different wavelengths that are coupled by the N filters onto the mirror onto the second optical element integrally formed in the unibody, the second optical element coupling the N light beams of the N different wavelengths into the optical port.

20. The optical communications module of claim 14, wherein said at least one optical waveguide comprises a single optical fiber.

21. The optical communications module of claim 14, wherein said at least one optical waveguide comprises M optical fibers, where M is a positive integer that is greater than or equal to 2, and wherein the unibody has a front portion that is adapted to couple with a Multi-fiber Push-On/Pull-Off (MPO) connector, the front portion of the unibody having first and second pins integrally formed thereon that are shaped, sized and positioned to mate with complementarily shaped, sized and positioned holes formed in a front portion of an MPO connector that holds ends of the M optical fibers, the front portion of the unibody comprising the optical port and having a linear array of M lenses disposed therein that are axially aligned with the ends of the M optical fibers held in the MPO connector when the MPO connector and the front portion of the unibody are coupled together, and wherein the first set of N optical elements, the second optical element and said one or more optical components that together comprise the optical coupling system are arranged to couple N light beams of N respective wavelengths of light onto each of the M lenses.

22. The optical communications module of claim 15, wherein the N optical elements of the first set of N optical elements tilt the N light beams, respectively, of the N respective different wavelengths, respectively, and direct the tilted light beams toward the N optical detectors, respectively.

23. The optical communications module of claim 22, wherein the N optical elements of the first set of N optical elements also focus the N light beams, respectively, onto the N optical detectors, respectively.

24. The optical communications module of claim 15, wherein said at least one optical waveguide is a multimode optical fiber, and wherein the N wavelengths range from about 840 nanometers (nm) to about 950 nm.

25. A bidirectional (BiDi) optical communications module comprising:
an integrally-formed optical unibody comprising an optical material that is transmissive to light of N wavelengths, where N is a positive integer that is greater than or equal to 2, the unibody comprising:
an optical port integrally formed in the unibody, the optical port being adapted to couple with an end of an optical cable having at least a first optical waveguide or with a ferrule disposed on the end of the optical cable;
at least first and second sets of passive alignment features integrally formed in the unibody;
at least a first set of N optical elements integrally formed in the unibody; and
at least a second optical element integrally formed in the unibody, wherein the first and second sets of passive alignment features are used to passively align one or more optical components with the unibody in at least first and second directions, wherein the first set of N optical elements, the second optical element and said one or more optical components together comprise an optical coupling system of the optical communications module and are arranged to couple at least a first light beam of a first wavelength into the optical port for transmission over the first optical waveguide and for receiving at least a second light beam of a second wavelength passing out of the end of the first optical waveguide into the optical port, the first and second wavelengths being different from one another.

* * * * *